(12) United States Patent
Chung et al.

(10) Patent No.: US 7,447,230 B2
(45) Date of Patent: Nov. 4, 2008

(54) SYSTEM FOR PROTOCOL PROCESSING ENGINE

(75) Inventors: Shen-Ming Chung, Sindian (TW);
Yun-Yen Chen, Kaohsiung (TW);
Yau-Cheng Tsai, Rende Township, Tainan County (TW)

(73) Assignee: Industrial Technology Research Institute, Hsinchu (TW)

( * ) Notice: Subject to any disclaimer, the term of this patent is extended or adjusted under 35 U.S.C. 154(b) by 627 days.

(21) Appl. No.: 11/106,624

(22) Filed: Apr. 15, 2005

(65) Prior Publication Data
US 2006/0092934 A1    May 4, 2006

(30) Foreign Application Priority Data
Oct. 29, 2004  (TW) .............................. 93132999 A

(51) Int. Cl.
*H04L 12/66* (2006.01)
(52) U.S. Cl. ..................... 370/463; 370/395.4; 370/412
(58) Field of Classification Search ........................ None
See application file for complete search history.

(56) References Cited

U.S. PATENT DOCUMENTS

| | | | |
|---|---|---|---|
| 5,937,169 A | 8/1999 | Connery et al. | |
| 6,246,683 B1 | 6/2001 | Connery et al. | |
| 6,412,092 B1 | 6/2002 | Raghunath | |
| 6,434,620 B1 | 8/2002 | Boucher et al. | |
| 6,591,302 B2 | 7/2003 | Boucher et al. | |
| 6,687,758 B2 | 2/2004 | Craft et al. | |
| 6,697,868 B2 | 2/2004 | Craft et al. | |
| 7,017,042 B1 * | 3/2006 | Ziai et al. | 713/161 |
| 7,324,540 B2 * | 1/2008 | Vangal et al. | 370/419 |

* cited by examiner

*Primary Examiner*—Chau Nguyen
*Assistant Examiner*—Louis Bell
(74) *Attorney, Agent, or Firm*—Bacon & Thomas, PLLC

(57) ABSTRACT

A protocol processing engine system, which is arranged between a host side and a media access control (MAC) layer to thus speed up data transmission. The system includes a host interface, a network media access control (MAC) interface, a receiving subsystem and a transmitting subsystem. The system uses the host interface to interface with the host side and the network MAC interface to interface with the network MAC layer. The receiving subsystem classifies a connection received from the network MAC layer into a priority connection, fast connection or slow connection based on a pre-stored information, and activates its respective hardware circuit based on the connection classified in order to speed up data transmission of the connection. The transmitting subsystem transmits a connection received from the host interface to the network MAC interface.

39 Claims, 27 Drawing Sheets

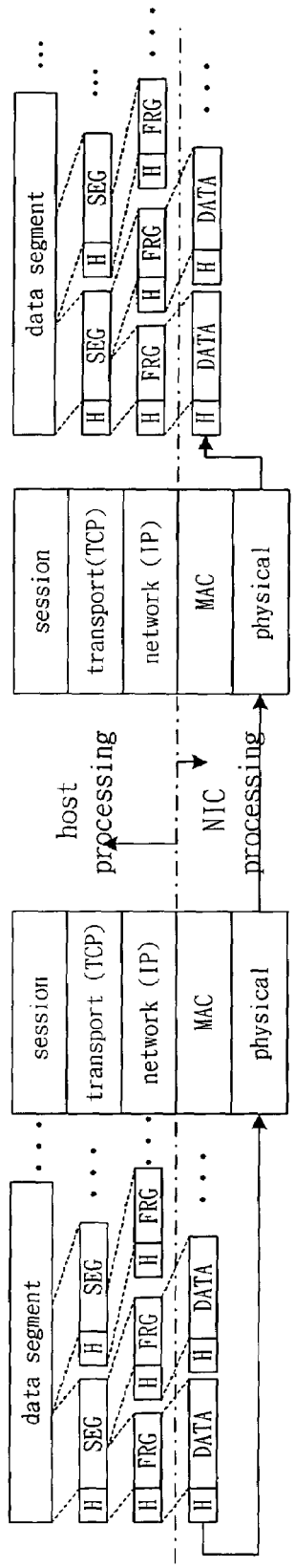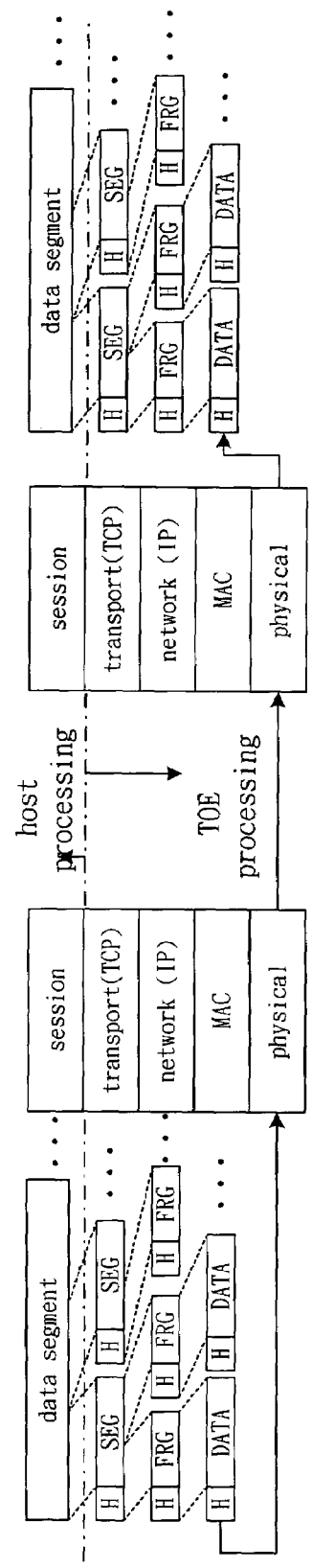
FIG. 3 (prior art)
FIG. 4 (prior art)

Event Element A

Event Element B

Event Element C

| | 6: TCP Flags | | 14: Payload Length | |
|---|---|---|---|---|
| D | 32: Source IP Address | | | |
| | 32: Destination IP Address | | | |
| | 16: Destination TCP Port | | 16: Source TCP Port | |

Event Element D

FIG. 13(d)

| O | IP Option(s) followed by TCP Option(s) |
|---|---|

Event Element O

FIG. 13(e)

| | CIT seeker | PPA | MCU | DMA_Rx engine | descriptor maker |
|---|---|---|---|---|---|
| event element A | | R | (R) | | |
| event element B | W/R | | R | | |
| event element C | | W/R | | R | R |
| event element D | R | | R | | R |
| (event element O) | | | R | | |

R: Read only, W/R: Write and Read, (R): Random

FIG. 14

The following algortihm explans how to logically move the head element of source queue to the tail of target queue by modifying their corresponding queue list:

```
//the algorithm begins below
    if ( target_queue_list.length == 0 )
    target_queue_list.head = source_queue_list.head;
    else
    Rx_Queue_list[target_queue_list.tail] = source_queue_list.head;
    target_queue_list.tail = source_queue_list.head;
    target_queue_list.length++;
    source_queue_list.head = Rx_Queue_list[source_queue_list.head];
    source_queue_list.length--;
//the end of the algortihm
```

FIG. 18

| switch state | bank0 | bank1 | bank2 | bank3 | next state | |
|---|---|---|---|---|---|---|
| | | | | | enabling=1 | enabling=0 |
| S0 | Port0 | Port1 | Port2 | Port3 | S1 | S0 |
| S1 | Port3 | Port0 | Port1 | Port2 | S2 | S1 |
| S2 | Port2 | Port3 | Port0 | Port1 | S3 | S2 |
| S3 | Port1 | Port2 | Port3 | Port0 | S0 | S3 |

SYSTEM FOR PROTOCOL PROCESSING ENGINE

BACKGROUND OF THE INVENTION

1. Field of the Invention

The invention relates to a technical field of local area networks (LANs) and, more particularly, to a general-purpose Transmission Control Protocol/Internet Protocol (TCP/IP) system for protocol processing engine.

2. Description of Related Art

Currently, the TCP/IP protocol is applied to Internet data accesses widely. Well-developed Internet applications greatly increase applicable servers, such as web servers and media servers. Such servers generally use an operating system to control a CPU on packaging, unpackaging and associated protocol processing of TCP/IP packets. However, the CPU requires a great number of processing cycles for processing the TCP/IP packets as a result of service requests rapidly increasing on the Internet, thereby reducing the performance.

In addition, with rapidly developed network transmission and semiconductor technologies, high-speed 1 Gbps Ethernet and fiber networks are popular. In this case, the operating system is applied to package and unpackage TCP/IP packets and process the associated protocol stack modes, so that the CPU has heavy load and the TCP/IP packet processing consumes most time. FIG. 1 is a schematic graph of CPU performance in different network maximum transmitting units (MTUs). As shown in FIG. 1, if a network server has a CPU clock of 500 MHz, a memory and peripheral bus bandwidth of 370 Mbps and a network maximum transmitting unit (MTU) range of 1.5 to 32 Kbytes, it is clear that the time spent on processing protocol by the CPU is reduced from 90% to 10% after different offloading functions are added when the MTU is at 32 Kbytes. This indicates that a network interface controller (NIC) capable of supporting a Gbps-level and above bandwidth requires not only a wider MTU but also a protocol offloading function for CPU load balance.

FIG. 2 is a schematic graph of a ratio of CPU to NIC bandwidth growth. As shown in FIG. 2, current network transceivers generally increase triple every year in bandwidth while current CPUs generally increase four times every three years in bandwidth, and accordingly a NIC needs to add a number of protocol processing functions, thereby reducing the CPU load and further avoiding an inefficient server or even an unacceptable server. As shown in FIG. 2, under the 1 Gbps bandwidth of a NIC in 2003, a protocol processing is still dealt by a conventional manner, which consumes all efficiencies of the most advanced Intel CPU in 2003. To allow the CPU completely realizing all services previously set by a server, the protocol processing is passed from the CPU to the NIC in order to balance the system load. Namely, to obtain better QoS, the server can apply a TCP/IP protocol offload engine for processing TCP/IP packets such that the CPU can process more service requests in a same time.

However, a typical NIC has not such a protocol offload engine for packaging, unpackaging and associated protocol stack processing of the TCP/IP packets, current 10/100 Mbps Ethernet networks all use an OS-based processing mode. FIG. 3 is a schematic diagram of an OS-based protocol stack processing mode. In a session layer, a payload to be sent is produced by a left-hand application of FIG. 3 in a memory, and next the application uses a system call to transfer the following performance to the OS. The OS divides the payload into segments and prefixes a transport header to each segment in a transport layer (where the TCP locates) to thus form transport packets. The transport packets are sent to a procedure of a network layer (where the IP locates). The procedure optionally performs a fragmentation based on sizes of the packets and an MTU supported by a media access control (MAC) and adds a network header in each fragment to thus form network packets. The network packets are established in a NIC that integrates the MAC and a physical layer to further add a MAC header in each packet and thus form Ethernet packets. The physical layer sends the Ethernet packets to a receiving side through an Ethernet. An unpackaging procedure is performed reversely from the physical layer to the session layer to accordingly restore the payload required by the application. Therefore, the conventional processing mode applies the OS to process the packaging and unpackaging of the transport layer (TCP) and network layer (IP).

Since most NICs in current local area networks can support over 1 Gbps bandwidth, to lessen the CPU load on the TCP/IP protocol processing, a NIC has to provide an offload function. FIG. 4 is a schematic diagram of a job sharing of a typical general-purpose TCP/IP protocol offload engine (TOE) and a host, which shifts the protocol layer processed by the NIC to the transport layer. The application uses an OS call to deliver the size of a payload to be sent and its base address to a driver of the TOE. The TOE sends TCP/IP packets completely packaged to the receiving side. A TOE of the receiving side unpackages the packets received and sends the payload obtained and unpackaged to a destination memory area of the application, thereby completing the transfer.

As shown in FIG. 4, it is an ideal sharing way that a job is shared by a TCP/IP protocol offload engine (TOE) and a host, but by a view of cost and economic benefit, due to numerous protocols on Ethernet and other networks, it does not meet with the cost benefit when the typical NIC adds in the TOE. The TOE depends on an application environment to select accelerating items with a higher efficiency to cost ratio. Other protocol processing with a low efficiency to cost ratio still uses the conventional protocol stack processing.

A transmission mechanism is disclosed in U.S. Pat. No. 6,591,302 that assembles a header required for each protocol processing from a protocol stack, combines the header and an appropriate size of data and sends the combined to next network layer. FIG. 5 is a schematic diagram of the transmission process disclosed in U.S. Pat. No. 6,591,302. A session sequencer sends the data to a transport sequencer via a multiplexer. The transport sequencer adds H1 headers in a packet buffer of divided transport segments to form transport packets. The transport packets are delivered to a network sequencer via the multiplexer to thus add H2 headers in the packet buffer of divided network fragments to form network packets. The network packets are delivered to a media access control (MAC) sequencer via the multiplexer to thus add a H3 header in front of each network packet to form Ethernet packets to output.

FIG. 6 is a schematic diagram of the receiving process disclosed in U.S. Pat. No. 6,591,302. The protocol processing in each layer extracts the headers from the packets received and compares them with connection data stored in the protocol stack to find a connection relation with the preceding layer, and the remaining payload data of this transmission is combined and sent to an upper layer of the protocol processing. As shown in FIG. 6, a packet control sequencer confirms the Ethernet packets sent by the MAC sequencer of FIG. 5 that are received. A multiplexer sends the packets received to a network sequencer to remove their H3 headers and combines the remainder and payload packets in a same network layer for further unpacking.

A RISC microprocessor with a protocol offload engine disclosed in U.S. Pat. No. 6,591,302 can speed up protocol offload performance but cannot easily obtain heavy complicated protocol errors and associated error recovery, which leads to a disadvantage of firmware cost increase. The errors occupy a slight part of the entire packets, but it deeply affects the CPU load when certain errors not necessary to interrupt the host CPU cannot be filtered effectively.

A SRAM disclosed in U.S. Pat. No. 6,591,302 is responsible to offload operation and performance. Any packet or data not able to offload immediately is moved from the SRAM to a DRAM having greater room and lower cost in order to wait until all other packets or information is arrived. Next, all information arrived is moved from the DRAM to the SRAM for offload performance. As such, it can simplify the offload engine design and the complexity of internal data path. However, data moved between the SRAM and the DRAM can relatively consume the bandwidth of internal circuits. In addition, the SRAM may lead to a bandwidth bottleneck. For a network bandwidth of 1 Gbps, a full duplex protocol offload engine needs a bandwidth of 2 Gbps, but a high-speed dual-port SRAM costs expensive. Therefore, it is desirable to provide an improved protocol offload engine to mitigate and/or obviate the aforementioned problems.

SUMMARY OF THE INVENTION

The object of the invention is to provide a system for protocol processing engine to eliminate the problem in that protocol errors and associated error recovery cannot be easily achieved and the problem of memory bandwidth in the prior art.

According to a feature of the invention, a system for protocol processing engine is provided, which is arranged between a host side and a media access control layer (MAC) to speed up data transmission. The system includes a host interface, a network MAC interface, a receiving subsystem and a transmitting subsystem. The host interface is used to interface with the host side. The network MAC interface is used to interface with the MAC layer. The receiving subsystem is coupled between the host interface and the network MAC interface such that a connection received by the network MAC interface is classified into a priority connection, fast connection or slow connection based on a pre-stored information and a hardware circuit corresponding to the connection classified is activated to speed up data transmission of the connection. The transmitting subsystem is coupled between the host interface and the network MAC interface in order to transmit a connection received by the host interface to the network MAC interface.

According to another feature of the invention, a system for protocol processing engine is provided, which is arranged between a host side and a media access control (MAC) layer to speed up data transmission. The system includes a host interface, a network MAC interface, a dynamic random access memory (DRAM) interface, a DRAM, a cache static random access memory (SRAM), a content addressable memory (CAM), a receiving controller, a scorekeeper, a receiving buffer, a receiving queue, a memory allocator, a connection information table (CIT) updater, a CIT seeker, a packet processing assistant (PPA), a microprocessor (MCU), a protocol control information (PCI) controller, a direct memory access receiving (DMA_Rx) engine, a descriptor maker, a descriptors and command buffer, a transmitting queue, a direct memory access (DMA) transmitting engine, a receiving queue management and a transmitting controller. The host interface interfaces with a host side. The network media access control (MAC) interface interfaces with the MAC layer. A dynamic random access memory (DRAM) is accessed through the DRAM interface. The DRAM stores packets to be processed and a connection information table (CIT). The cache static random access memory (SRAM) stores priority connection information. The CAM provides the information of priority connections in the cache SRAM for fast searching. The receiving controller is coupled to the network MAC interface in order to receive a connection transmitted by the network MAC interface. The scorekeeper is coupled to the receiving controller in order to handle accesses and associated use situations of the CAM. The receiving buffer is coupled to the receiving controller in order to store a received packet. The receiving queue is coupled to the receiving controller in order to store the received packet or its payload. The memory allocator is coupled to the receiving controller in order to allocate the receiving buffer such that the receiving controller is able to move the payload in place. The CIT updater establishes information of a new connection information in the DRAM. The CIT seeker is coupled to the receiving queue in order to search the DRAM for a matched fast connection information in accordance with a receiving event in the CIT seeker queue and next write a base memory address, which starts to store the fast connection information, back to the receiving event. The PPA is coupled to the receiving queue in order to obtain a destination information of the received packet according to a content of the PPA queue. The MCU is coupled to the receiving queue in order to handle supported communication protocols. The PCI controller is coupled to a PCI interface to transmit and receive data of the host side. The DMA_Rx engine arranges an address of a host destination in the PPA or the MCU, places the address in a respective packet header information stored in the receiving queue, and sends a packet or its payload corresponding to the respective packet header information to the host side through the PCI controller. The descriptor maker produces a receiving descriptor corresponding to the packet or its payload sent by the DMA_Rx engine and uses the PCI controller to send the receiving descriptor produced to the host side. The descriptors and command buffer stores transmitting descriptors of host transmitting connections for further processing by the MCU. The transmitting queue stores processed transmitting descriptors that are processed by the MCU. The transmitting buffer stores payload data of the host transmitting connections. The header generator produces a packet header of a host transmitting connection. The global register file stores control information, connection information, payloads, packets of slow path connections, and processed status. The DMA transmitting engine moves the CIT descriptors to the descriptors and command buffer. The receiving queue management manages the receiving queue. The transmitting controller sends the received packet to the MAC layer.

Other objects, advantages, and novel features of the invention will become more apparent from the following detailed description when taken in conjunction with the accompanying drawings.

BRIEF DESCRIPTION OF THE DRAWINGS

FIG. 3 is a schematic diagram of an OS-based protocol stack processing mode;

FIG. 4 is a schematic diagram of a job sharing of a typical general-purpose TCP/IP protocol offload engine (TOE) and a host;

FIG. 14 is a relational table of receiving event elements and corresponding processing devices according to the invention;

FIG. 18 is a schematic graph of receiving event elements moved among six receiving queues according to the invention;

DETAILED DESCRIPTION OF THE PREFERRED EMBODIMENT

Figure 1:
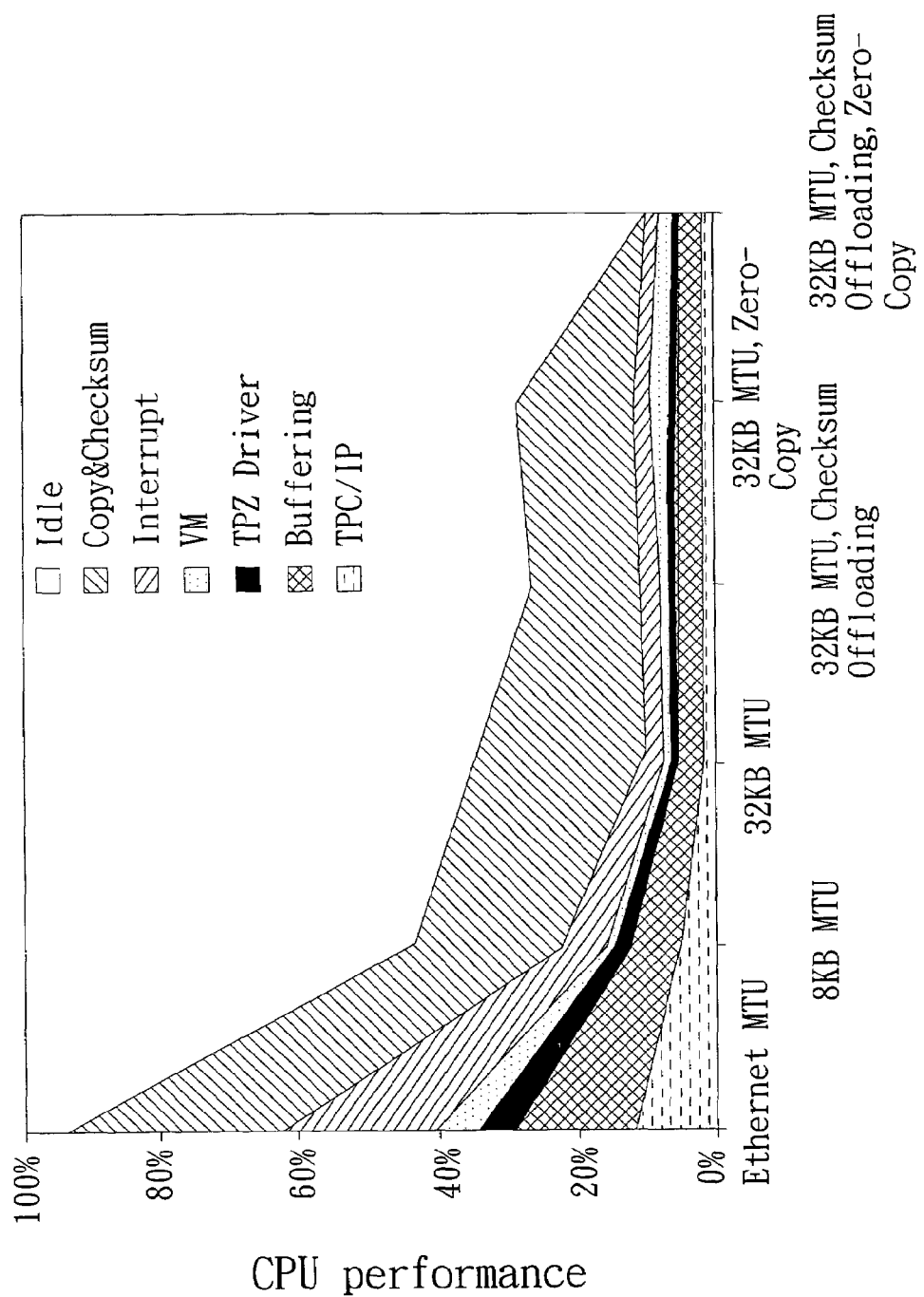
FIG. 1 is a schematic graph of CPU performance in different network maximum transmitting units (MTUs)
Figure 2:
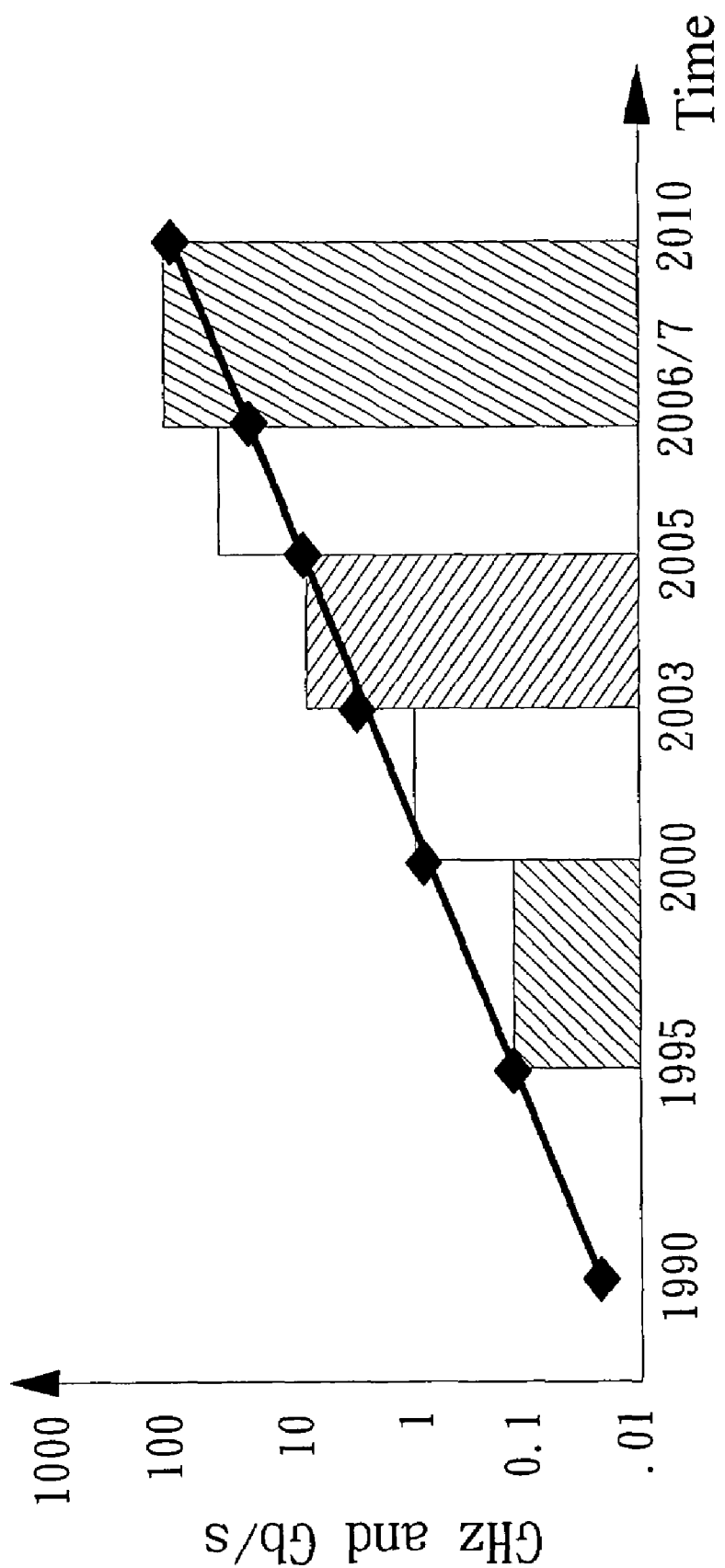
FIG. 2 is a schematic graph of a ratio of CPU to NIC bandwidth growth.
Figure 5:
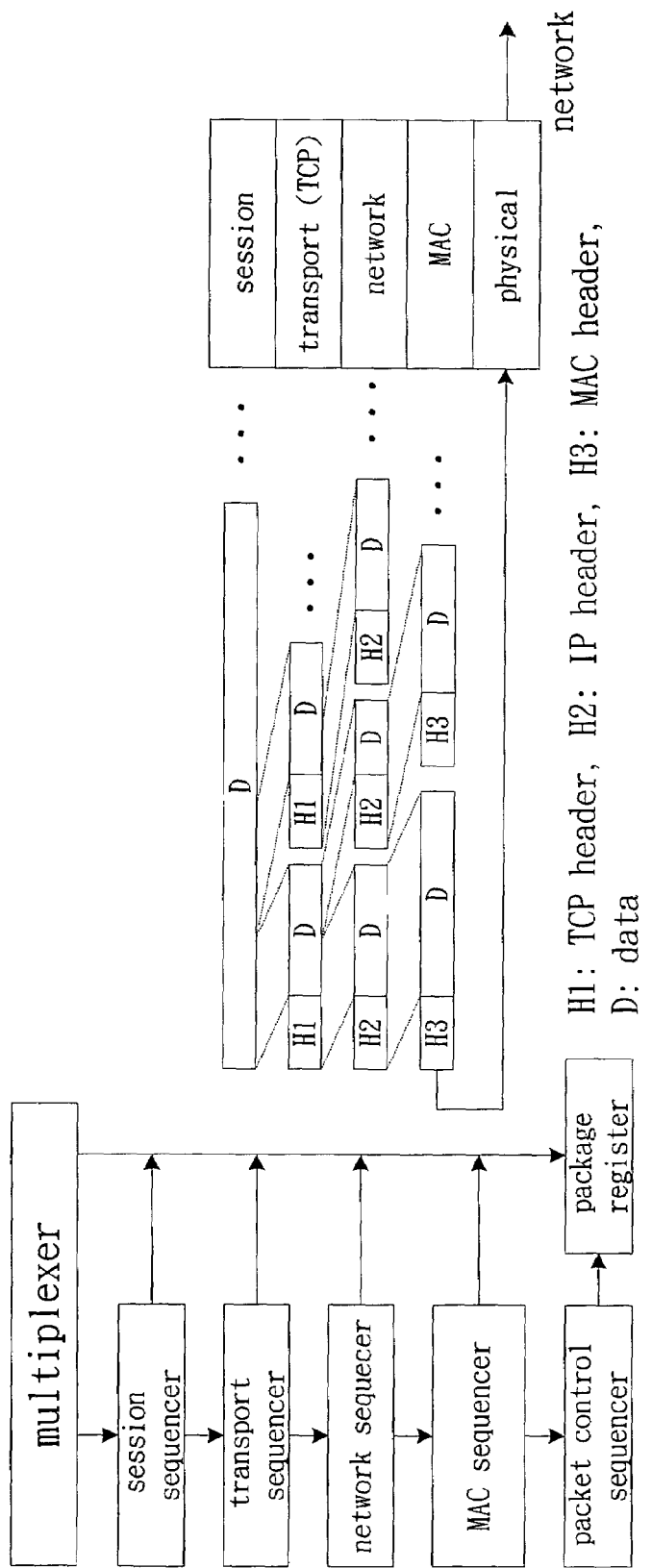
FIG. 5 is a schematic diagram of a typical transmission process.
Figure 6:
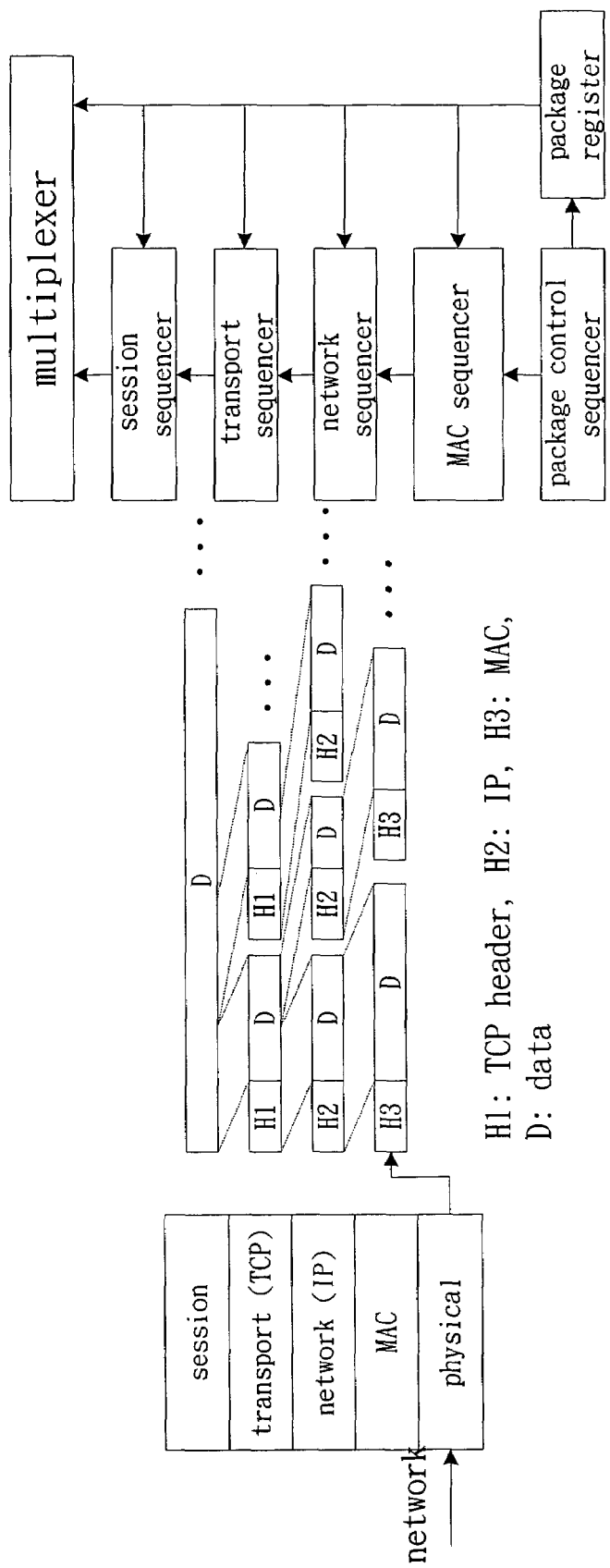
FIG. 6 is a schematic diagram of a typical receiving process.
Figure 7:
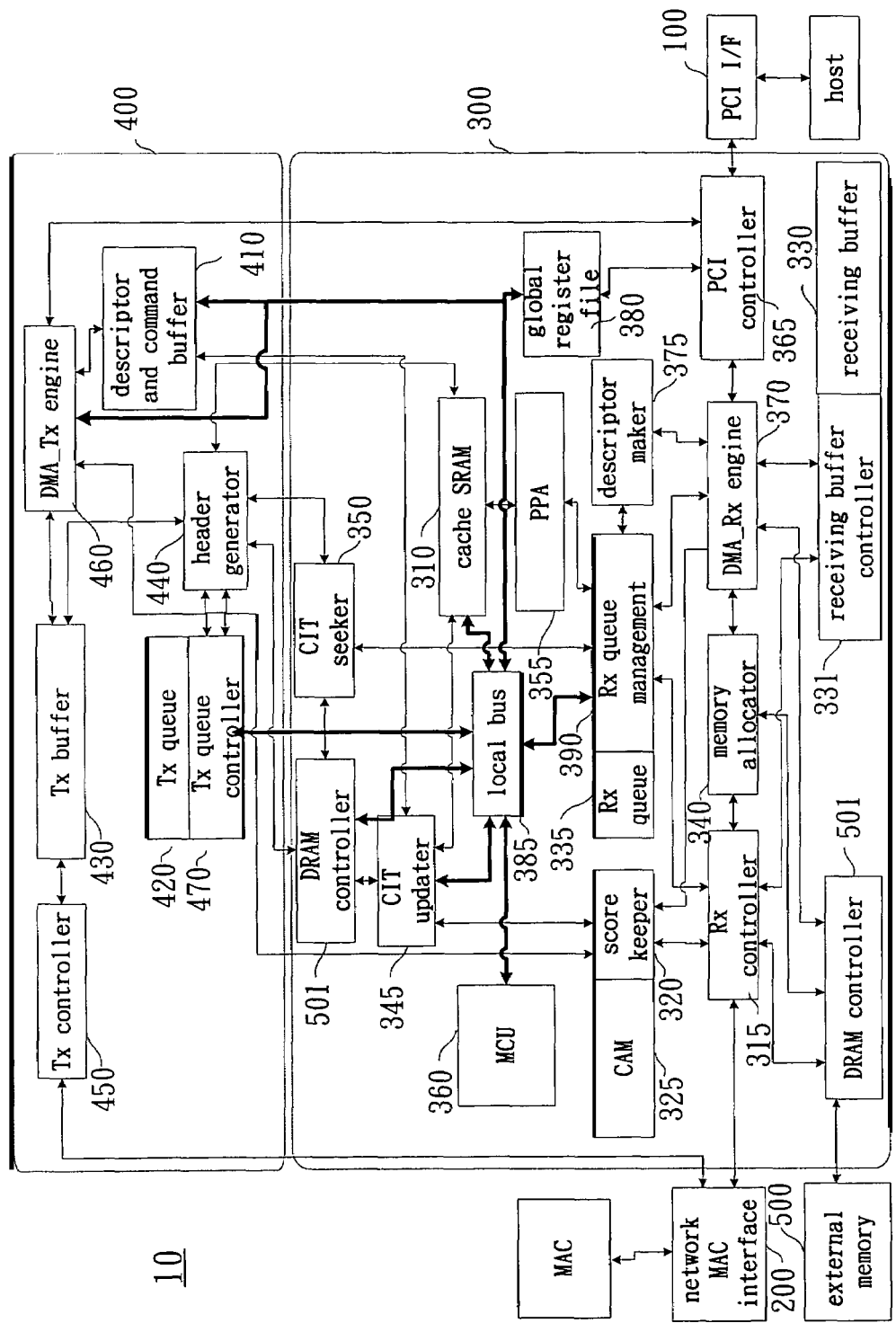
FIG. 7 is a block diagram of a system for protocol processing engine system according to the invention.

FIG. 7 is a block diagram of a system 10 for protocol processing engine according to the invention. The system 10 is implemented between a host side and a media access control (MAC) layer to speed up data transmission. The system 10 includes a host interface 100, a network media access control (MAC) interface 200, a receiving subsystem 300 and a transmitting subsystem 400. The host interface 100 is used to interface with a host side. The network MAC interface 200 is used to interface with the MAC layer. The system 10 also connects to an external memory 500 to temporarily store associated connection data. The external memory 500 can be a dynamic random access memory (DRAM).

The receiving subsystem 300 is coupled between the host interface 100 and the network MAC interface 200 such that a connection received by the network MAC interface 200 can be classified into a priority connection, fast connection or slow connection based on a pre-stored information, and activates its respective hardware circuit based on the connection classified, thereby speeding up data transmission of the connection.

The transmitting subsystem 400 is coupled between the host interface 100 and the network MAC interface 200 such that a connection received from the host interface 100 can be transmitted to the network MAC interface 200. The host interface 100 can be a PCI interface.

The receiving subsystem 300 includes a cache static random access memory (cache SRAM) 310, a receiving controller (Rx controller) 315, a scorekeeper 320, a content addressable memory (CAM) 325, a receiving buffer (Rx buffer) 330, a receiving queue (Rx queue) 335, a memory allocator 340, a connection information table (CIT) updater 345, a CIT seeker 350, a packet processing assistant (PPA) 355, a microprocessor (MCU) 360, a PCI controller 365, a direct memory access receiving (DMA_Rx) engine 370, a descriptor maker 375, a global register file 380, a local bus 385, a receiving queue management (Rx queue management) 390, a DRAM controller 501 and a receiving buffer controller 331.

The external DRAM 500 stores packets for processing and a connection information table (CIT). The cache SRAM 310 stores priority connection information. The Rx controller 315 is coupled to the network MAC interface to receive a connection. The scorekeeper 320 is coupled to the Rx controller 315 in order to handle accesses and associated use situations of the CAM 325. The CAM 325 is coupled to the scorekeeper 320 in order to perform fast searching on the cache SRAM for required priority connection information. The Rx controller 315 defines destination and source's IP addresses and TCP ports, which is extracted from a header of a packet that receives the connection, as a connection identification (CID) and accordingly searches the CAM 325 through the scorekeeper 320, thereby determining if the connection is a priority connection.

The Rx buffer 330 is coupled to the Rx controller 315 in order to store a received packet. The Rx queue 335 is coupled to the Rx controller 315 in order to store a received packet or its payload.

The memory allocator 340 is connection to the Rx controller 315 in order to allocate the Rx buffer 330 or addresses of available space in an external DRAM 500 such that the Rx controller 315 can move the payload in an appropriate storage space. The Rx controller 315 sends a request to the memory allocator 340 for temporarily storing the packet or its payload in the Rx buffer 330 or the external DRAM 500.

The Rx controller 315 re-arranges a header of the received packet into a data structure of a receiving event (Rx event) and sends it to the Rx queue 335. The CIT updater 345 produces a new connection information in the external DRAM 500. The CIT seeker 350 is coupled to the Rx queue management 390 in order to search the external DRAM 500 for a desired fast connection information based on the Rx event in the CIT seeker queue and write a memory base address of the fast connection information stored to the Rx event. The packet processing assistant (PPA) 355 is coupled with the Rx queue 335 through the Rx queue management 390 and obtains a packet destination information according to data stored in the PPA queue 3352. The MCU 360 is coupled to the local bus 385 in order to handle a supported communication protocol.

The PCI controller 365 is coupled to the PCI interface 100 in order to transmit and receive data of the host side. The DMA_Rx engine 370 arranges a host destination address in the PPA 355 or MCU 360, adds it to a respective packet header information in the Rx queue 335, and sends a packet or its payload with the respective packet header information to the host side through the PCI controller 365. The descriptor maker 375 produces a receiving (Rx) descriptor corresponding to a packet or its payload and uses the PCI controller to send the Rx descriptor produced to the host side.

The transmitting subsystem 400 includes a descriptor and command buffer 410, a transmitting (Tx) queue 420, a Tx buffer 430, a header generator 440, a Tx controller 450, a DMA transmitting (DMA_Tx) engine 460 and a Tx queue controller 470.

The descriptors and command buffer 410 stores Tx descriptors of a host transmitting connection for the MCU to further processing. The Tx queue 420 stores the Tx descriptors processed by the MCU 360. The Tx buffer 430 stores payload data of the host transmitting connection. The header generator 440 produces a packet header of the host transmitting connection. The Tx controller sends a packet to the MAC layer.

The host interface 100 can be a typical PCI, PCI-X interface and the like. The host interface 100 and its control circuit are a standard interface communicating with a host. Applications on the host side use application programming interface (API) provided by the protocol offload engine system 10 to send a network connection to be speeded to the OS. A device driver exchanges control information, connection information, payload, packets of slow path connection and processing status with, such as, the global register file 380 and memory of the system 10 through the host interface 100 and its control circuit.

For applying an offload function of the system 10, offloaded connections are established. In this embodiment, the offloaded connections are referred to as fast path connections or, briefly fast connections. The host can establish a new fast connection through the system 10. The MCU 360 completes an analysis of the control information and drives associated circuit to download connection information arranged by the host through the host interface 100 to a connection information table (CIT). Accordingly, the host can refer the CIT and determine if a connection packet is a fast connection. The CIT is stored in the cache memory 310.

The CIT applies a two-level management, thereby obtaining a balance of performance and cost. The first level consists of a content addressable memory (CAM) 325 and a static random access memory (SRAM) 310. The second level consists of an external dynamic random access memory (DRAM) having a slower access speed. An initial CIT is stored in the external DRAM 500. The SRAM 310 is used to quickly fetch fast connections in the DRAM 500. The fast connections fetched are referred to as priority fast path connections or, briefly, priority connections.

Since the SRAM 310 functions as a cache, it is also referred to as a cache SRAM 310. Each of the priority connection has a connection identification (CID) for distinction, and the CIDs are stored in the CAM 325. Accordingly, the CAM 325 in the first level can provide fast searching for the priority connections in the SRAM 310. The memory address of a CID in the CAM 325 directly indicates to a block base address of a priority connection with the CID stored in the cache SRAM 310. Therefore, the CAM 325 can be used to quickly determine if a connection packet is a priority connection and obtain an address corresponding to the priority connection in the cache SRAM 310.

After the connection is established, the host can start to use the system 10 in packet generation. The host sends a control information, which contains transmitting packet commands and associated information, to the MCU 360 through the host interface 100 and the descriptors and command buffer 410 for further analysis. After the analysis, the MCU 360 place an analyzed result in the Tx queue 420. The associated circuit performs the analyzed result based on a use situation of memory resources of the Tx buffer 430. The procedure performed includes that downloading payload arranged by the host through the host interface 100 and sending the downloaded to the Tx buffer 430, constructing a header according to a packet connection information, assembling the header and the payload into a packet, and updating the connection information. After the packet is complete, the Tx controller 450 appropriately sends the packet to a network through a network media access control (MAC) at an appropriate time point.

In a packet receiving side, the network MAC interface 200 receives the packet and sends the header to the Rx controller 315. The Rx controller 315 uses a CID of the packet to check the content of the CAM 315 for finding a desired priority connection. If the packet is belong to one of the priority connections of the cache SRAM 310 and has a packet length not less than the maximum transmitting unit (MTU), its payload is stored in the built-in Rx buffer 330 of the Rx controller 315; otherwise, in the external DRAM 500 temporarily. Available addresses of the Rx buffer 330 or the DRAM 500 are provided by the memory allocator 340. Accordingly, the Rx controller 315 can successfully move the payload in place. In addition, the Rx controller 315 arranges the header of the packet in the Rx buffer 330 and adds other associated information, such as temporary addresses of the payload. When the packet passes error detection, such as checksum, the arranged and added information is sent to the Rx queue 335 for further processing. If a data error is detected in the packet, the Rx controller 315 discards the information stored in the Rx queue 335 and requests the memory allocator 340 to release the provided memory space.

To avoid over-accumulation of the payload in the expensive Rx buffer 330 that is caused by a low processing rate of the MCU 360, it is necessary to effectively disperse the payload. To achieve this, the packet processing assistant (PPA) 355 is used to fast fetch a host destination information of the packet in order to rapidly forward the payload to a memory on the host while the protocol associated information of the packet in the Rx queue 335 is processed at a lower rate. In addition, the PPA 355 can support some simple protocol routines, such as an auto acknowledgement and other simple but high present protocol processing procedures. Complicated protocol processing procedures such as processing of optional fields, quality of service (QoS) are completed by a firmware of the MCU 360.

Fast Connection Establishment and Connection Information Table (CIT) Management

Figure 8:
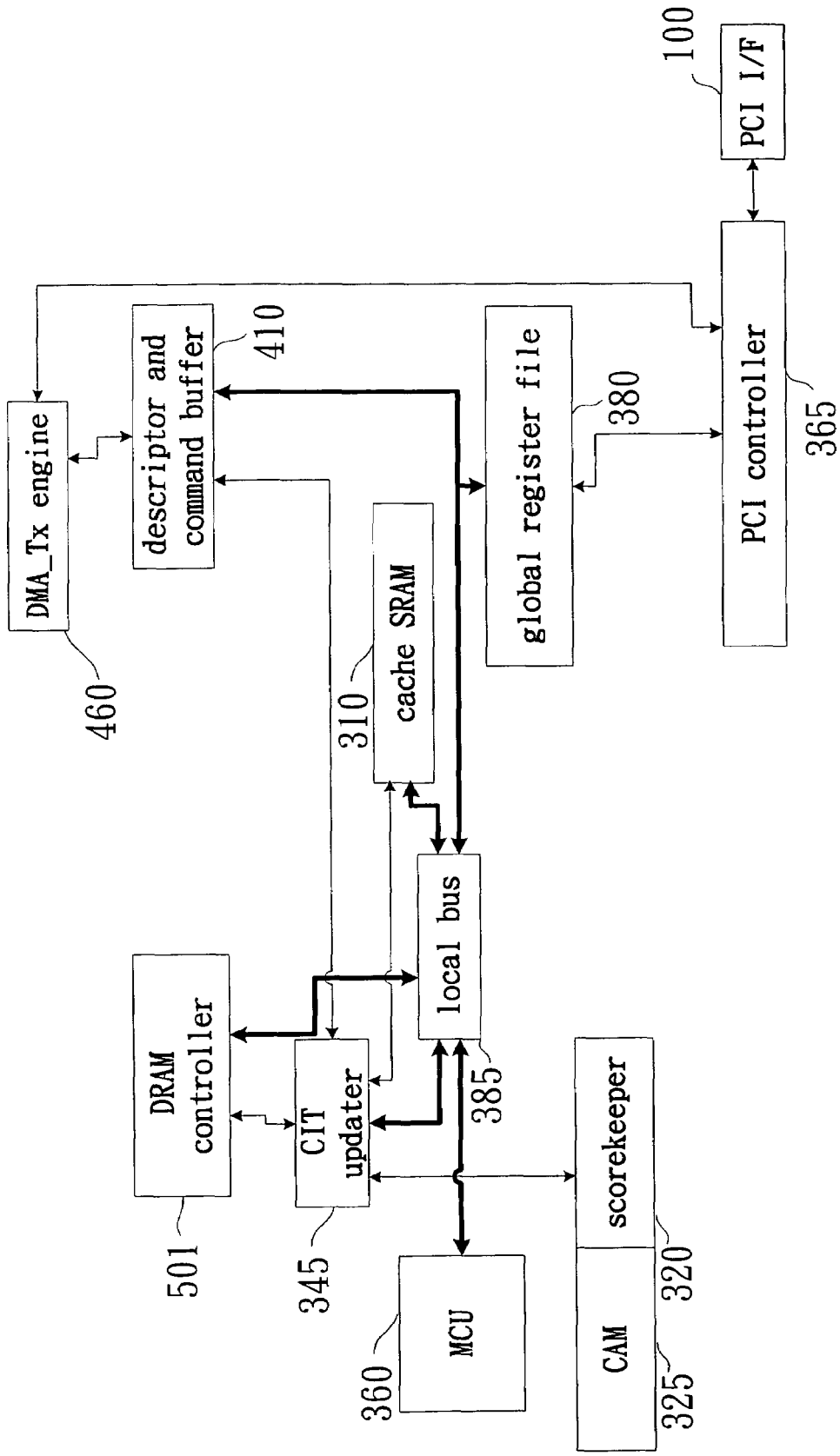
FIG. 8 is schematic diagram of establishment and update of a connection information table according to the invention.

The CIT records all connection information of the fast connections, which is stored in the DRAM 500. There are k (preferably, 16) fast connections of the CIT are copied to the cache SRAM 310 as priority connections. Also, the corresponding CIDs of the k priority connections are placed in the CAM 325 and thus the priority connections are recognized by the Rx controller 315 at first time when a packet comes. FIG. 8 is schematic diagram of establishment and update of a connection information table.

The connection information in the CIT is provided by the host. When the host desires to establish a new fast connection, a conventional protocol stack on the host is applied to a memory of the host for establishing connection information associated with the new fast connection. A content of the connection information has partial information required by the system 10 that is arranged into CIT descriptors by the host and placed in a separate memory space. When the descriptors are completely arranged, the host records memory addresses, which indicate a location where the CIT descriptors are placed, to the global register file 380 of the system 10 through the host interface 100 and sets a New Connection Establishment flag of the file 380 to high to thus notice the MCU 360 this event occurrence.

When the MCU 360 finds that the flag is set to high, it forwards the memory addresses of the CIT descriptors to the DAM_Tx engine 460. The engine 460 accordingly moves the CIT descriptors to the descriptors and command buffer 410. The CIT updater 345 uses the CIT descriptors in the descriptors and command buffer 410 to start to establish a new connection information in a CIT space of the DRAM 500. In addition, if the cache SRAM 310 still has free memory space, the CIT update 345 also establishes a connection information in the cache SRAM 310, which is the same as the new connection information and has a CID. The CIT update 345 registers the CID in the CAM 325 through the scorekeeper 320. Next, the CIT updater 345 sets the New Connection Establishment flag of the global register file 380 to low, which indicates that the new connection is established and another new connection can start to be established.

Received Data Flow and Associated Configuration Design

Figure 9:
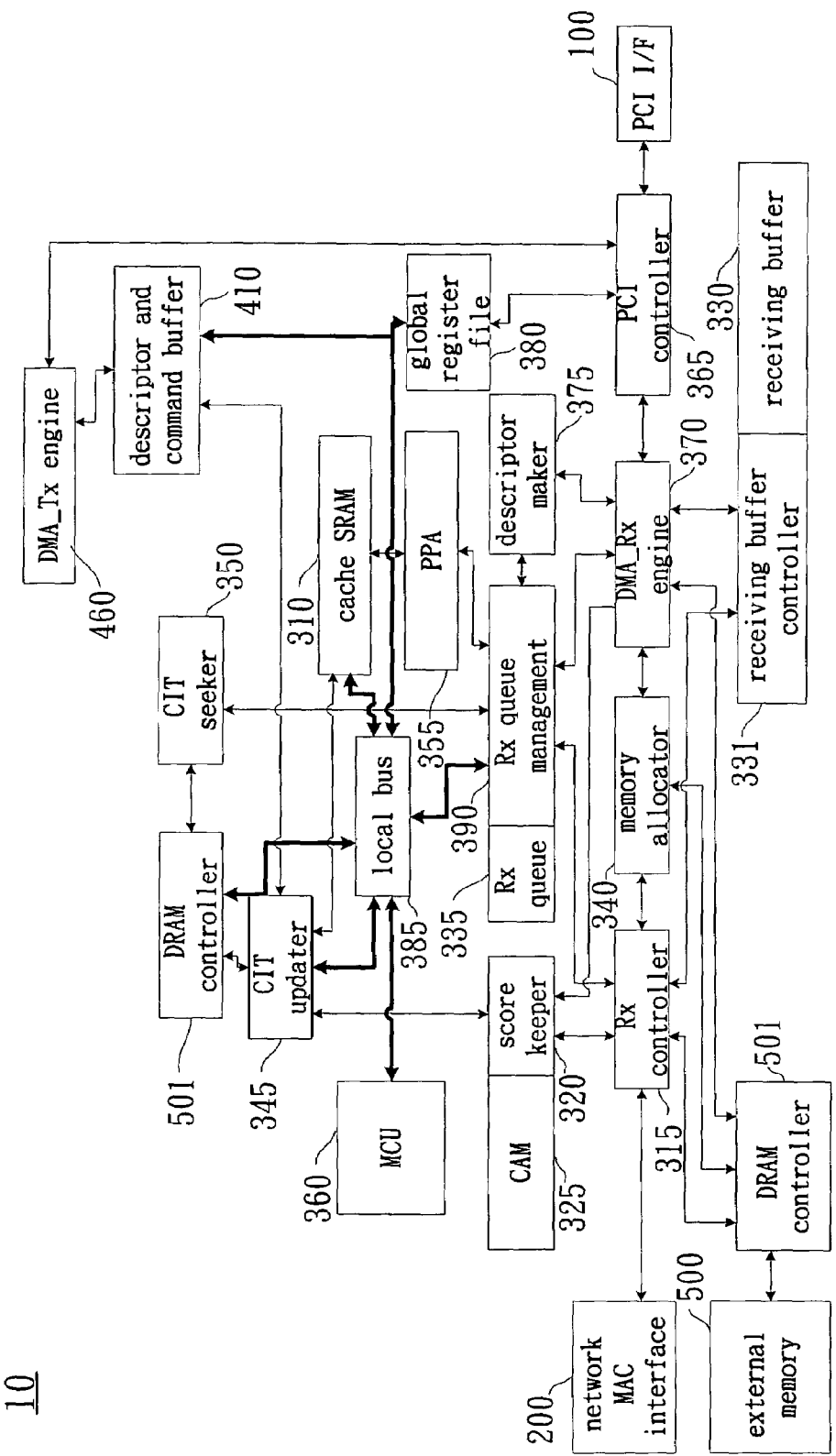
FIG. 9 is a schematic diagram of a data flow receiving configuration of FIG. 7 according to the invention.

FIG. 9 is a schematic diagram of a data flow receiving configuration of the system 10. As shown in FIG. 9, a received data flow originates from the MAC, and the Rx controller 315 of the system 10 manages first-line receiving and analysis.

The Rx controller 315 performs first analysis and recognition on a received packet and extracts destination and source's IP addresses and TCP ports from the received packet to thus define the information as a CID. The CID is applied to the CAM 325 for fast searching through the scorekeeper 320. If a matched CID in the CAM 325 exists, it indicates that the received packet is of a priority connection. The CAM 325 accordingly responds a memory address to the Rx controller 315. The memory address records addresses of the cache SRAM 310 for storing connection information of the received packet. If the matched CID does not exist, it indicates that the connection information of the received packet is not stored in the cache SRAM 310 but may be placed in the DRAM 500, or even not established by the system 10.

According to a searching result of the CAM 325 and a size of the received packet, the Rx controller 315 sends a request to the memory allocator 340 for temporarily storing the packet (or its payload) to the Rx buffer 330 or the DRAM 500. The memory allocator 340 assigns appropriate buffer addresses in response. The Rx controller 315 uses the buffer addresses assigned by the memory allocator 340 to store the packet or its payload.

Briefly, if a packet is of priority connection, the Rx controller 315 sends a payload of the packet to buffer area assigned by the memory allocator 340 for temporary store. However, if the packet is not of priority connection, the Rx controller 315 sends the entire packet to the buffer area assigned by the memory allocator 340 for temporary store.

While a packet is processed, the Rx controller 315 re-arranges a header of the packet into a data structure for internal processing and sends the header re-arranged to the Rx queue 335. The data structure is referred to as an Rx event. The packet or its payload is sent to addresses assigned by the memory allocator 340 for temporary store.

According to a searching result of the CAM 325 and a size of a received packet, the Rx controller 315 sends a request to the memory allocator 340 for temporarily storing the received packet (or its payload) to the Rx buffer 330 or the DRAM 500. If the CAM contains a CID matched with that of the received packet, it indicates that connection information of the received packet can be accessed quickly in the cache SRAM 310 and protocol information contained in the header of the received packet can be processed quicker. In this case, the memory allocator 340 provides available addresses of the Rx buffer 330 to thus temporarily store the payload of the received packet.

On the contrary, if the CAM does not contain the CID matched with that of the received packet, it indicates that the cache SRAM 310 has not the connection information. Moreover, the connection information may not be established in the CIT of the DRAM 500, namely, the received packet may not be processed effectively and quickly. In this case, the Rx controller 315 requests the memory allocator 340 to provide current available addresses of the DRAM 500 for temporarily storing the received packet. Accordingly, the Rx buffer 330 of the system 10 is used to reserve the priority connections in the cache SRAM 310.

When a received packet has a size smaller than the network MTU defined by the LAN, the packet belongs to an odd transmission, not a large transmission. In order to have the best use, the Rx buffer 330 is generally applied in large data or packet transmission. Therefore, even the CID of the packet is recorded in the CAM 325, the Rx controller typically requests the memory allocator to provide such an odd packet transmission with available addresses of the DRAM 500 for temporarily store. However, when the Rx buffer 330 has large use space, the memory allocator 340 still responds available memory addresses of the Rx buffer 330 to the Rx controller 315. In this case, the Rx controller temporarily stores the packet or its payload in the Rx buffer 330.

In addition, the memory allocator 340 can ignore the request from the Rx controller and force the Rx controller 315 to temporarily store the packet or its payload in the DRAM 500, which occurs only when the Rx buffer 330 has memory space insufficient or surplus.

Figure 10:
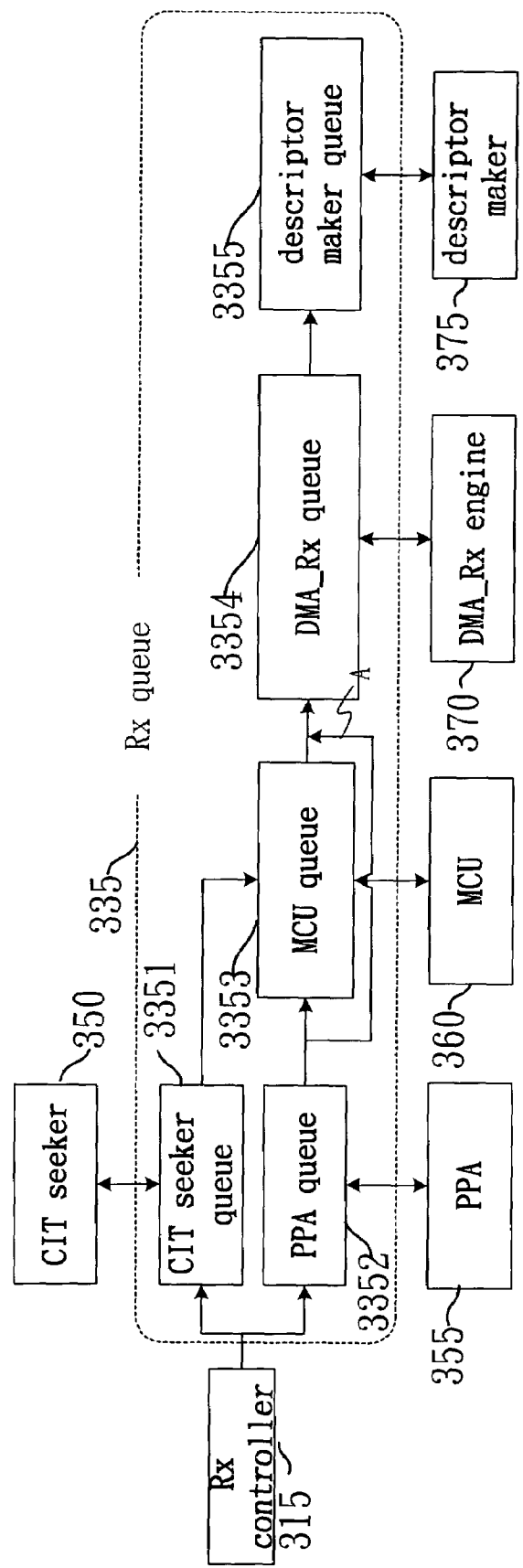
FIG. 10 is a schematic diagram of pipelining of a receiving queue according to the invention.

After a packet header is arranged into a Rx event, the Rx controller 315 places the Rx event in the Rx queue 335 by segmentation. FIG. 10 is a schematic diagram of pipelining of the receiving queue 335. The Rx queue 335 is logically shared by five queues. The five queues consist of a CIT seeker queue 3351, a PPA queue 3352, a MCU queue 3353, a DMA_Rx queue 3354 and a descriptor maker queue 3355, which are connected in series and used respectively by the CIT seeker 350, the PPA 355, the MCU 360, the DMA_Rx engine 370 and the descriptor maker 375. The five processing modules, i.e., the devices 350, 355, 360, 370, 375, thus obtain pipelining mechanism through the five queues and reduce the use of the MCU local bus.

As shown in FIG. 10, the Rx controller 315 places the Rx event in the CIT seeker queue 3351 or the PPA queue 3352 by segmentation. When the CIT seeker 350 and the PPA 355 completely process their respective queues, the Rx event flows to the MCU, the DMA_Rx engine 370 and the descriptor maker 375 sequentially. A path A in FIG. 10 provides the PPA 355 capable of skipping the MCU queue and directly sending a host destination information to the DAM_Rx queue 3354.

The PPA 355 essentially handles packets that present CIDs matched in the CAM 325, i.e., the packets are of the priority connections of the cache SRAM. For such packets, the PPA 355 can assist the MCU 360 in processing a part of high regularity and repeat protocol processing events, but the Rx events are still processed by the MCU 360. In addition, the speedup of the PPA 355 can allow the predication of a memory size of the Rx buffer 330 to be easier, which can be appreciated in FIGS. 11(a) and 11(b).

Figure 11A:
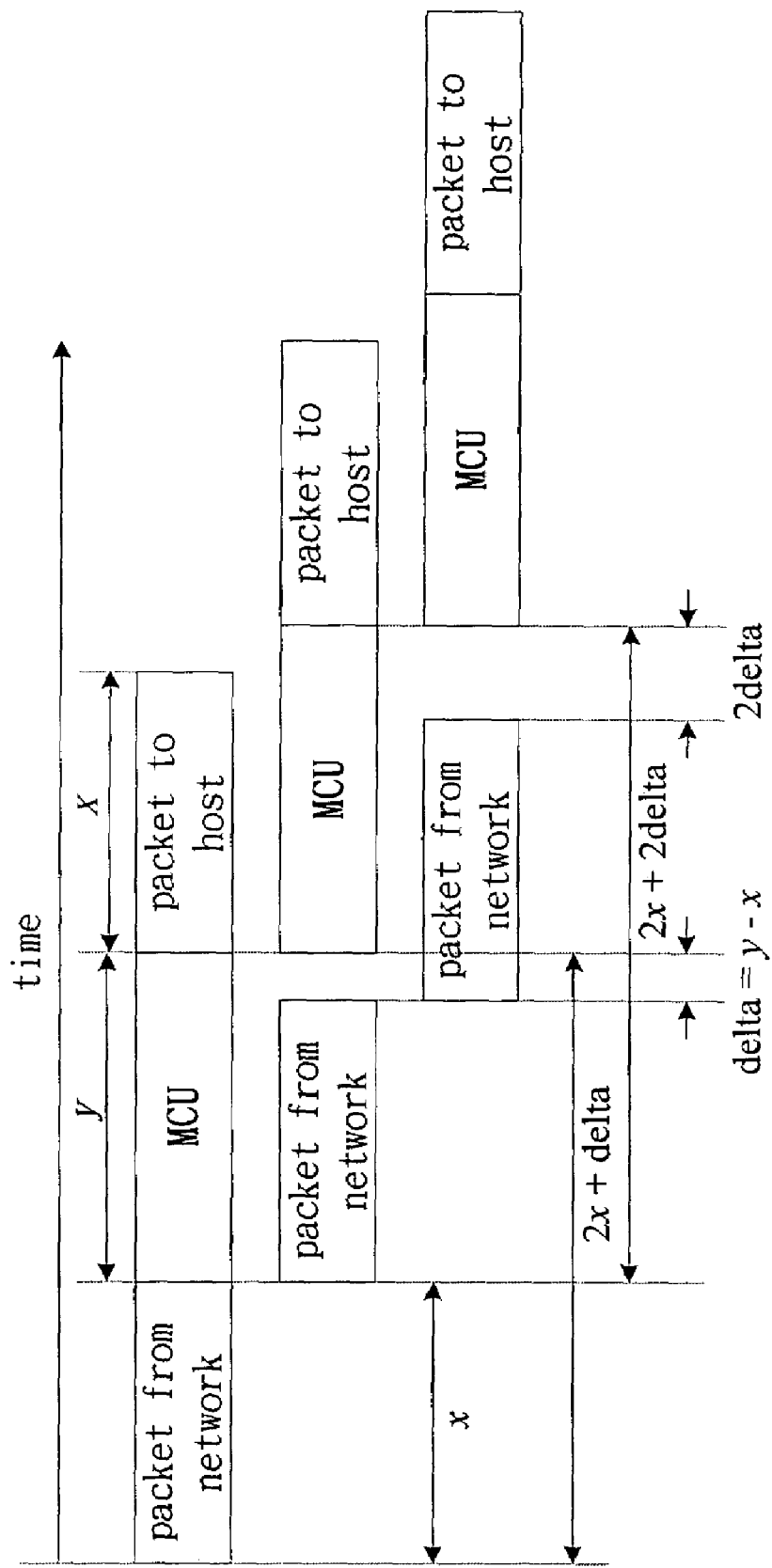
FIG. 11(a) is a schematic diagram illustrating packet number accumulated in a buffer continuously increasing according to the invention.
Figure 11B:
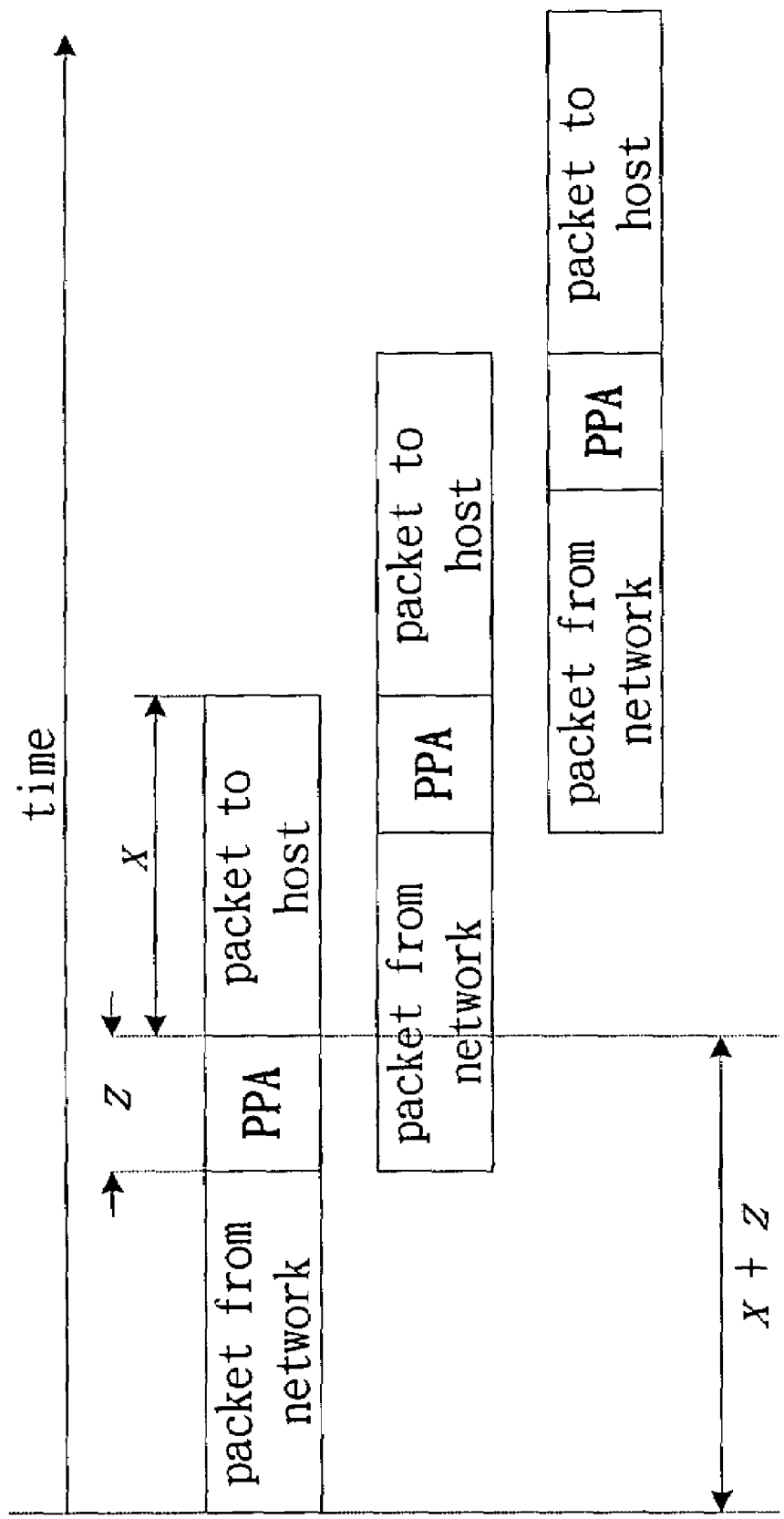
FIG. 11(b) is a schematic diagram illustrating the PPA to effectively reduce accumulated packets in a buffer according to the invention.

FIG. 11(a) is a schematic diagram illustrating packet number accumulated in the Rx buffer 330 continuously increasing when a processing time of the MCU 360 is too long. FIG. 11(b) is a schematic diagram illustrating the PPA 355 to effectively reduce the accumulated packets for the MCU 360.

The most complicated task of the system 10 in the receiving part is to perform protocol processing on the header of each packet, particularly on optional fields of the header. Due to high variety of the optional fields, the system 10 uses the MCU 360 to process the various optional fields. In FIG. 11(a), suppose that the system 10 only uses the MCU 360 to handle any situation to be happened in the protocol processing of each packet header and x system clock cycles are required for temporarily storing a received packet in the buffer of the system 10 and moving the received packet to the host respectively. If the MCU 360 requires y system clock cycles for processing the header of a current packet and y is greater than x, it is still processing a previous header after the current packet is stored completely. In this case, under the same packet input and output rate, the buffer in the system 10 will be insufficient to store packets or their payloads sooner or later.

To overcome this, the PPA 355 also provides a function of reducing packets to be output by quickly finding the host destination information of a packet and accordingly skipping the MCU 360 to directly send the host destination information to the DMA_Rx queue 3354, as shown in the path A of FIG. 10. Thus, the DMA_Rx 370 can send the packet (or its payload) to the host earlier. The reduction effect is shown in FIG. 11(b) in which packets accumulated in the buffer can be quickly forwarded to the host without continuous accumulation in the system 10 because a short processing time for the PPA 355 does not cause a bottleneck of packet output, thereby reducing packet number accumulated. As compared to FIG. 11(a), an appropriate size required for the buffer can be estimated easily. After the packets or their payloads are moved to the host with the help of the PPA 355, the MCU 360 may be still processing the header information in the Rx queue 335, but since a memory cost of "Wait To Be Processed" is successfully eliminated from the Rx buffer 330, the remaining cost is fallen only in the Rx queue 335.

Accordingly, it is clear that the MCU 360 is the last solution of the protocol processing. The MCU 360 can process all communication protocols supported by the system 10, such as IP, TCP, ARP and the like. Regarding to protocols not supported by the system 10, the MCU 360 has no operation except for periodic network running analysis to ensure no hacker attack. In this case, the PPA 355 contributes a packet being moved to the host for further processing by a conventional protocol stack.

The PPA 355 quickly processes only the priority connection packets in the cache SRAM 310, and packet header information not matched with that of the CAM 325 is not moved to the PPA sub-queue 3352 by the Rx controller 315 but moved to the CIT seeker queue 3351. The CIT seeker 350 searches the CIT of the DRAM 500 for matching a fast connection information with a Rx event of the CIT seeker queue 3351 and stores a base memory address of the fast connection information in the Rx event for further processing by the MCU 360. The MCU 360 accesses the connection information of the packet and accordingly determines whether or not the connection information is copied to the cache SRAM to be a priority connection. If the connection for the packet is determined to be the priority connection, the CIT updater 345 also registers a CID of the connection in the CAM 325 through the scorekeeper 320 in addition to the copy, thereby completing an establishment procedure of the priority connection.

As cited, only the MCU 360 and the PPA 355 access the content of connection information in the DRAM 500 or the cache SRAM 310. In addition, in this embodiment, a process of write-back, not write-through, is applied to cache management for the cache SRAM 310.

For write-through cache management, a priority connection or fast connection has to find its CIT address in the CIT of the DRAM 500. In addition, when updating data, connection information associated with both the DRAM 500 and the cache SRAM 310 has to be updated concurrently. As such, if the priority connections of the cache SRAM 310 have very high probability of read and write, write-through increases huge signal switching and occupies numerous bandwidth of the DRAM 500, and further reduces processing rate. However, with contrast to write-through, if the priority connections of the cache SRAM 310 also have very high probability of read and write, write-back only occupies a bandwidth of connection between the cache SRAM 310 and the PPA 355 or the MCU 360, and the DRAM 500 is used only when a priority connection is updated. Therefore, write-back costs lower than write-through, and this is the reason that write-back is applied.

The DMA_Rx engine 370 sends packet (or its payload) corresponding to a packet header information to a host memory through the PCI controller 365 after the PPA 355 or the MCU 360 arranges a host destination address and places it in the packet header information recorded in the Rx queue 335. After the packet or its payload is sent to the host memory, the descriptor maker 375 generates a Rx descriptor for the packet or its payload and sends the Rx descriptor to a host Rx queue of the host memory through the PCI controller 365. All descriptors accumulated in the Rx queue 335 are processed by the central processing unit (CPU) in batches after an interrupt coalescing event of the host side occurs, thereby completing the entire packet receiving flow.

One of two logical DRAMs in FIG. 9 stores the CIT and the other stores packet (or its payload). However, in fact, the two data types are placed in a same physical DRAM but different memory spaces and controlled by a DRAM controller 501. Because multiple modules share the DRAM 500, a DRAM management (not shown) is introduced to distribute corresponding DRAM bandwidth.

The spaces of the DRAM 500 that stores CIT and packet (or its payload) are referred to as a CIT space and a buffer space respectively. In addition, the DRAM has one more space for managing the buffer space, which is referred to as a list space.

Receiving Event

The system 10 has five processing modules associated with the receiving configuration to use the Rx queue 335 in successive processes for pipelining. The five processing modules may need different packet header information. Accordingly, resources used in the successive processes can be arranged appropriately to thus obtain more effective control. A receiving (Rx) event is a data structure established in the Rx controller based on the header of a received packet. Such a data structure is designed by referring the hardware features of the system 10 to thus effectively use memory resource and increase the take-over performance of the five processing modules.

Figure 12:
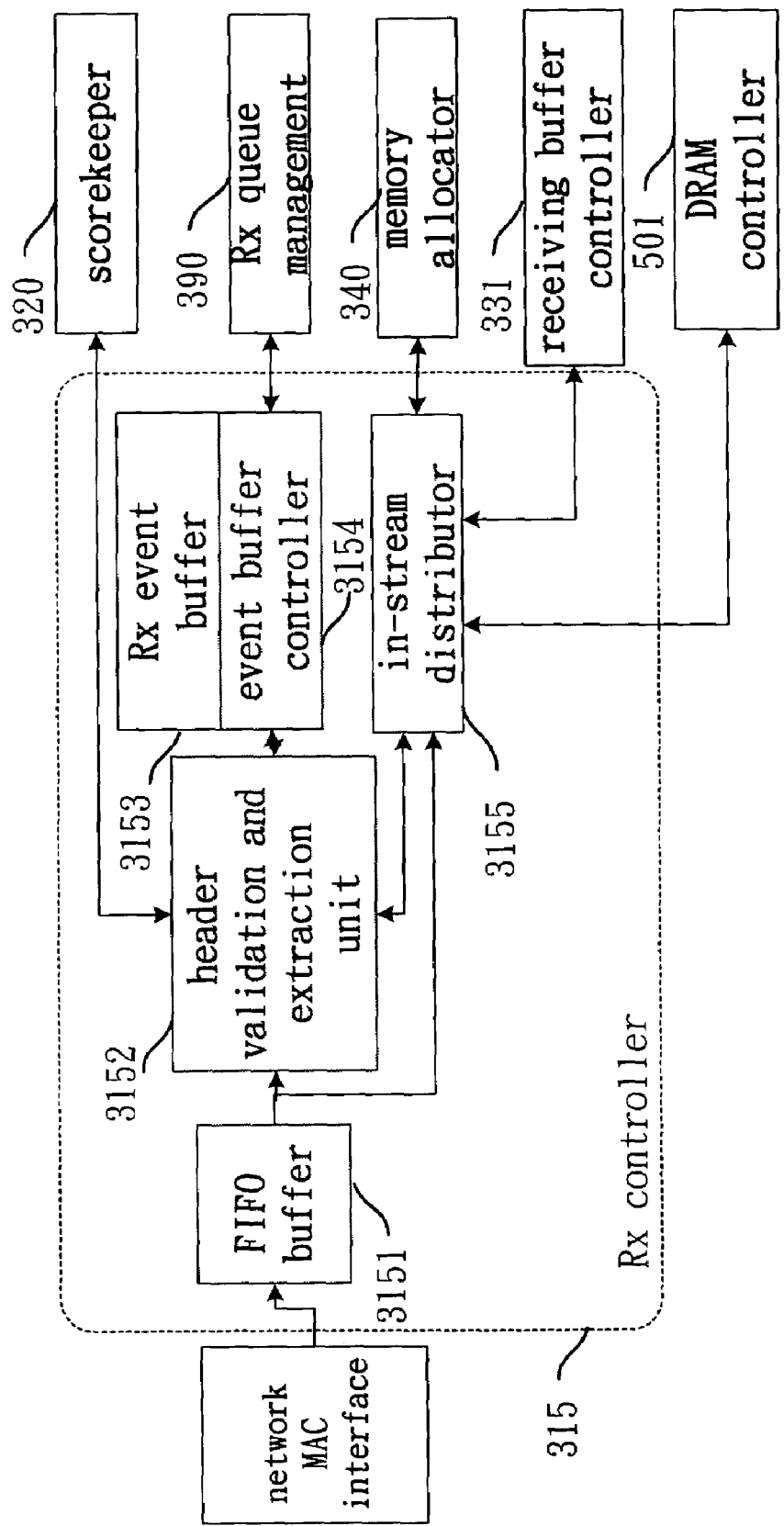
FIG. 12 is a schematic diagram of a receiving controller according to the invention.

FIG. 12 is a block diagram of the receiving (Rx) controller 315. In FIG. 12, the Rx controller 315 includes a first-in first-out (FIFO) buffer 3151, a header validation and extraction unit 3152, an Rx event buffer 3153, an event buffer controller 3154 and an in-stream distributor 3155. The Rx controller 315 forwards a received packet sent by the MAC to the unit 3152 through the FIFO buffer 3151. The unit 3152 analyzes the content of a header of the received packet, including checking identification fields in the header, detecting errors of the header and its payload and comparing the scorekeeper 320 and the CAM 325 to find CIDs matched. In addition, the Rx controller 315 extracts fields required for the five processing modules from the header when checking the fields and temporarily stores the fields extracted in the Rx event buffer 3153 through the event buffer controller 3154 based on the data structure designed.

As shown in FIG. 12, the packet is divided into two parts in the Rx controller 315. Namely, the header of the packet forms the Rx event and is temporarily stored in the Rx event buffer 3153 and the packet or its payload is directed by the in-stream distributor 3155 into an assigned buffer. When the header and payload of the packet pass all error detection, the Rx event is sent by the event buffer controller 3154 to the Rx queue 335 to be a valid Rx event. Conversely, if any error of the packet is detected, the Rx event is discarded to be a false Rx event and remained in the Rx event buffer 3153.

The Rx event buffer 3153 consists of three physical SRAMs, each having a size of 128 bytes to contain a Rx event having option fields. Accordingly, the Rx event buffer 3153 can store at most three Rx events to be sent to the Rx queue 335 at a time, which is of the worst case in predication. In addition, the Rx event buffer 3153 is managed by the event buffer controller 3154 in a way of allowing the three SRAMs to input and output the Rx events in a form of ring queue.

Figure 13A:
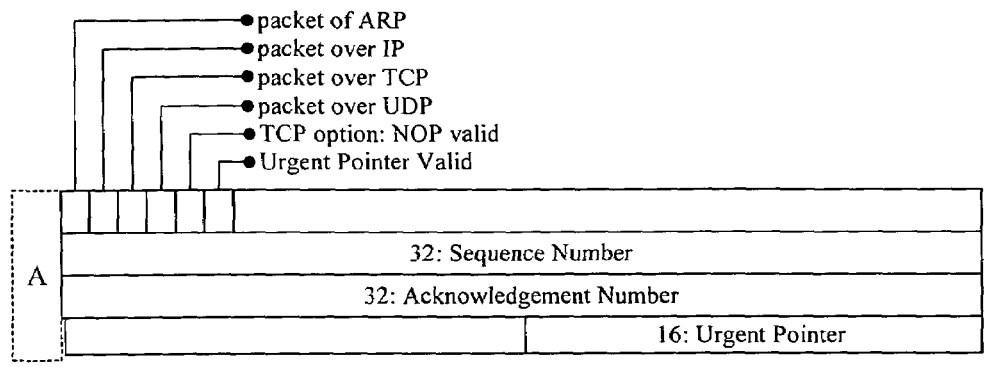
FIG. 13 is schematic formats of event elements according to the invention.
Figure 13B:
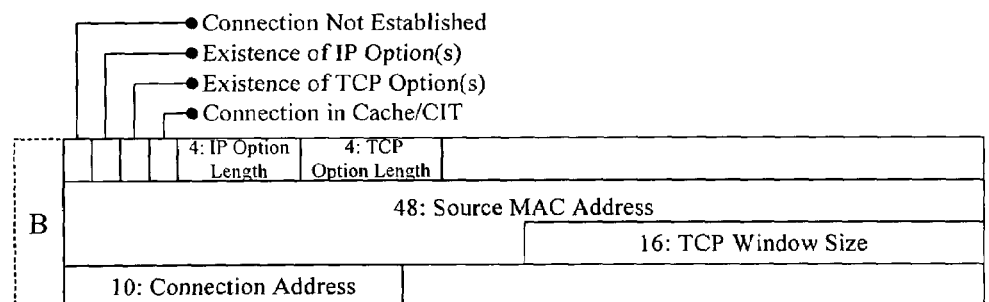
Figure 13C:
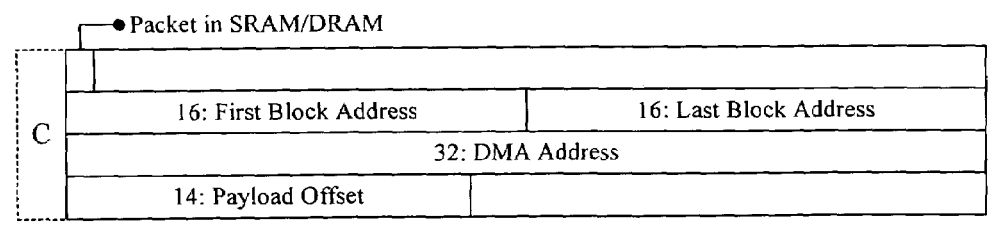

FIGS. 13(*a*)-13(*e*) are schematic formats of event elements according to the invention, wherein the header fields used by the five processing modules can be classified into several types of event elements, and the Rx event consists of event elements. When the header and payload of the packet pass predetermined error detection, all event elements corresponding to the packet are regarded as an Rx event and sent to the Rx queue 335 in batches. In FIGS. 13(*a*)-13(*e*), number in front of a field name indicates bit number to be occupied by the filed name; if there is no number in front of the field name, it indicates that only one bit is occupied by the field name.

As cited, according to required header fields, FIGS. 13(*a*)-(*e*) are classified into Event Element A-D and O. FIG. 14 is a relational table of the Rx event elements and corresponding processing devices according to the invention. In FIG. 14, the use time of each event element in the Rx queue 335 can be known. Since the Rx queue 335 distributes memory space in a unit of event element, the size of a unit memory block in the Rx queue 335 is the same as that of an event element.

Figure 15:
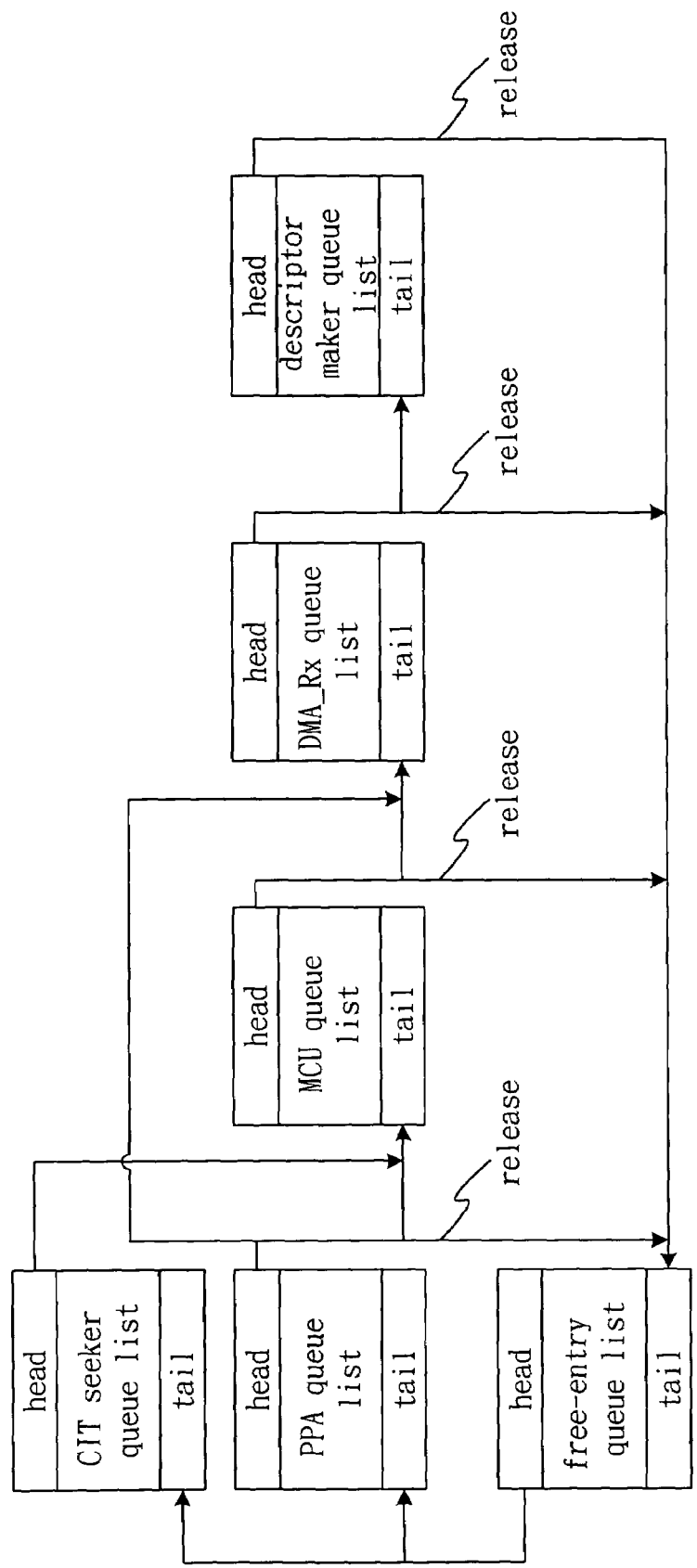
FIG. 15 is a schematic diagram of a receiving event element flow in a receiving queue according to the invention.

As shown in FIG. 14, when an event element is not required by a subsequent processing module or device, memory space occupied by the event element is released. Such a release mechanism first regards an address of the unit memory block of each event element as an element of the list of data structure and then manages the five queues corresponding to the processing modules or devices by their respective queue lists and corresponding connective form shown in FIG. 15. FIG. 15 is a schematic diagram of a receiving event element flow in the Rx queue 335 according to the invention. In addition to the management of the five queue lists, a free-queue list is added to manage free unit memory block space in the Rx queue 335.

For receiving and releasing the receiving event element in the Rx queue 335, the six lists in FIG. 15 can be stored in a same separate SRAM. Each list can exist only one receiving event element that is an address of next element to be linked. In addition, the address of each element can be mapped to a unit block storing an event element.

Figure 16:
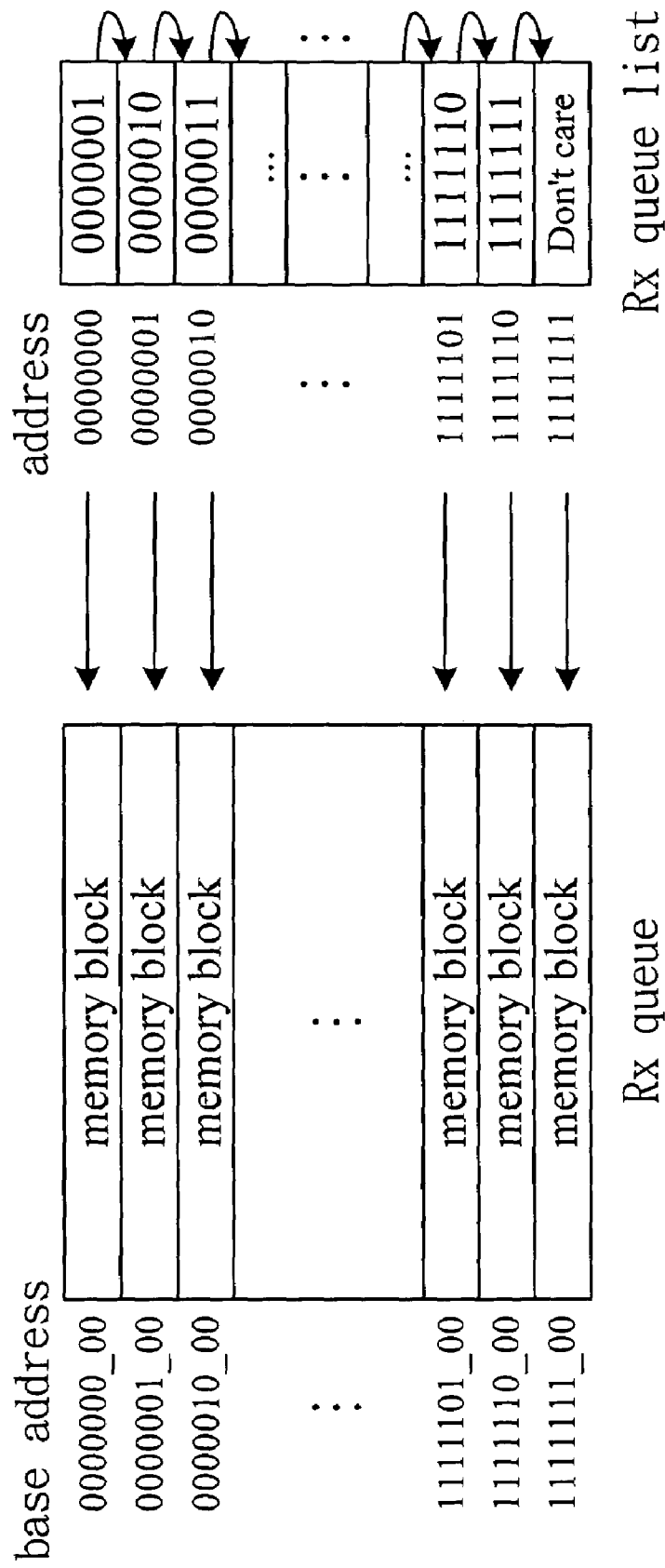
FIG. 16 is an initial mapping relation of a receiving queue and a receiving queue list according to the invention.

FIG. 16 is an initial mapping relation of a receiving queue and a receiving queue list according to the invention. It is assumed that the Rx queue 335 has 128 memory blocks, each being able to store a data amount of 16 bytes, and is addressed in a unit of four bytes (32 bits).

An Rx event contains several Rx event elements and thus needs to occupy a plurality of memory blocks in the Rx queue 335. As shown in FIG. 15, some Rx event elements can be released sequentially with the Rx event elements respectively processed by the five processing modules in relay. Namely, used memory blocks in the Rx queue 335 can be released one after another as the five processing modules take over their respective processing in sequence. As such, the number of queued Rx events in the Rx queue 335 is increased.

Figure 17A:
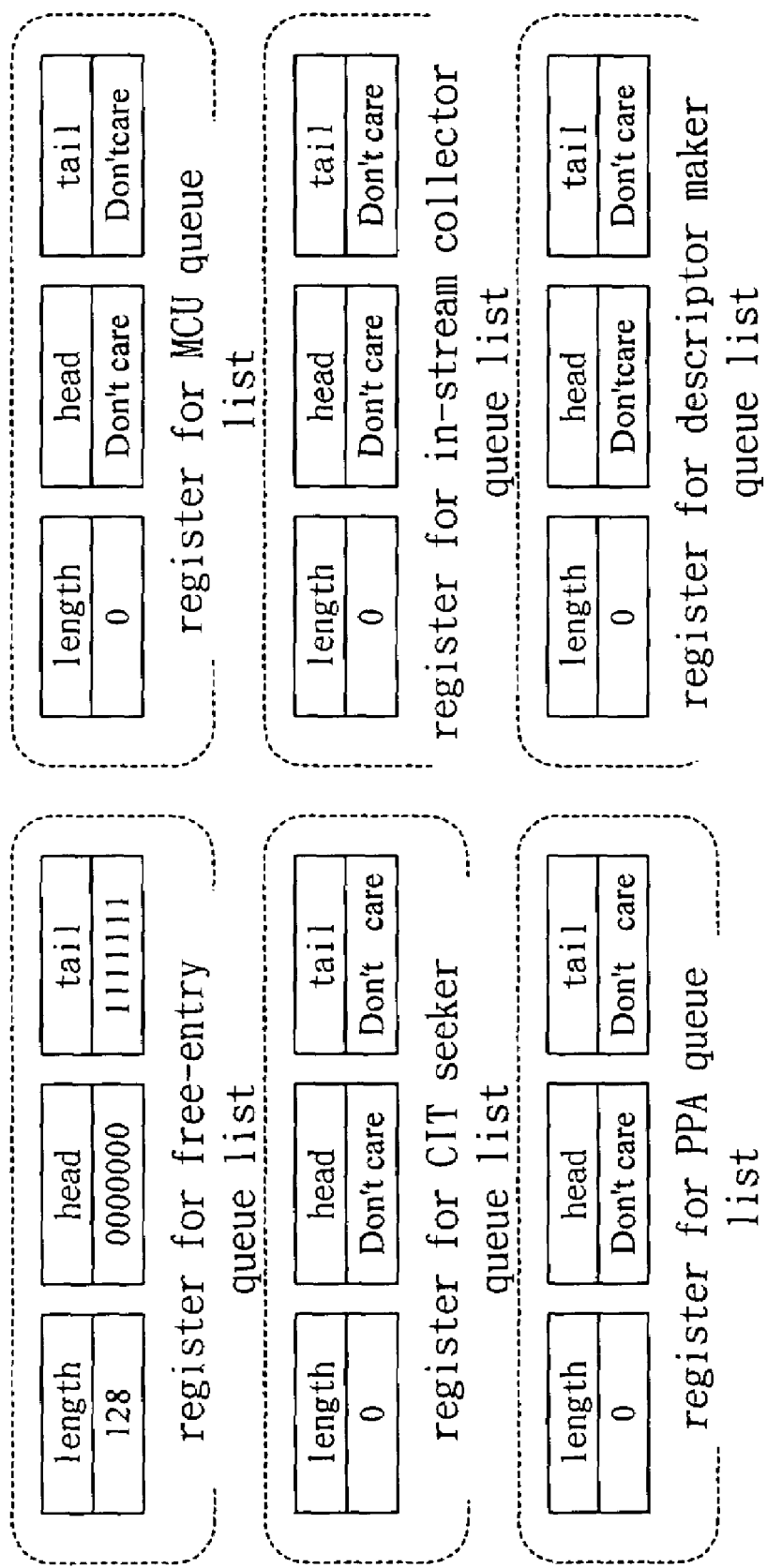
FIG. 17(a) is a schematic diagram of registers respectively recording the status of six lists according to the invention.
Figure 17B:
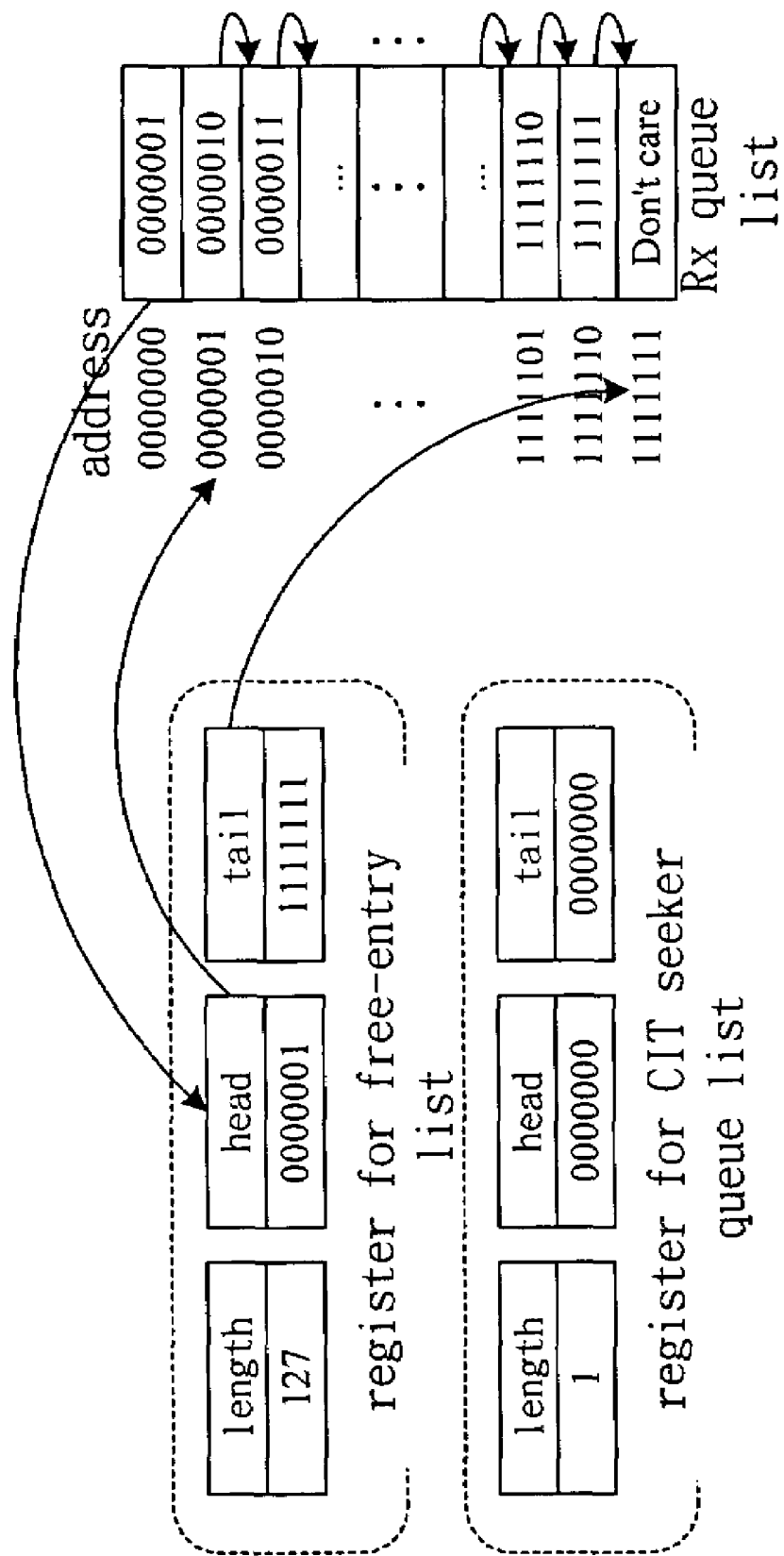
FIG. 17(b) is a schematic graph of registers updated when a receiving event element enters a receiving queue according to the invention.

Initially, the status of heads, tails and lengths of the six lists in FIG. 15 can be recorded respectively in registers of FIG. 17(*a*) while link status of the six lists is recorded in the Rx queue list.

FIG. 17(*a*) is a schematic diagram of registers respectively recording the status of the six lists according to the invention. FIG. 17(*b*) is a schematic graph of the registers updated when a receiving event element enters the receiving queue 335. When the Rx controller 315 sends the receiving event element to the Rx queue management 390, the Rx queue management 390 uses a memory block mapped by the head of the free-entry queue list to temporarily store the Rx event element. The content of an address, which is originally indicated by the head of the free-entry queue list register, of the Rx queue list indicates a next element address for updating the head of the free-entry queue. For example, if the Rx controller 315 desires to move an Rx event element to the CIT seeker queue 3351 when a packet corresponding to the Rx event element is not of a priority connection, the register used to manage the CIT seeker queue list are updated by changing the content of the head and tail of the register to be the content of the head of the free-entry queue list and also increasing the content of the length of the three registers by one. In addition, when a list has a length greater than zero, the content of an address, which is indicated by the original content of the tail of a register corresponding to the list, of the Rx queue list is changed into a new content of the tail of the register.

FIG. 17(*b*) shows corresponding contents set for the CIT seeker queue list and the free-entry queue list when an Rx event element is assigned to place in the CIT seeker queue 3351 after initialization.

FIG. 18 is a schematic graph of receiving event elements moved among the six receiving queues according to the invention, which is expressed by the pseudo codes of C language and can be implemented alternately in another hardware descriptive language by a person skilled in the art. As shown in FIG. 18, the Rx queue list and the queue lists are used to move a head element of a source queue to that of a target queue and form a tail element of the target queue, thereby obtaining logical movement without physically moving any element in the Rx queue 335. In addition, the queue list, the registers in the queue list and the Rx queue list are expressed by the expressions of structure, element and array in C language.

Figure 19:
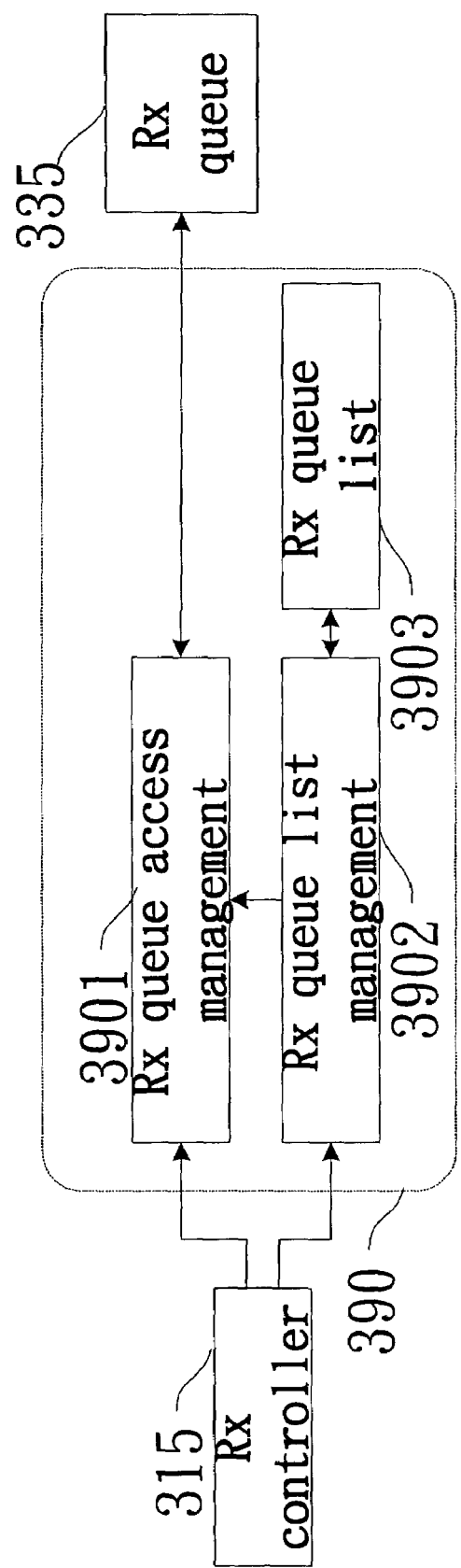
FIG. 19 is a block diagram of a receiving queue management according to the invention.

FIG. 19 is a block diagram of the receiving (Rx) queue management 390 according to the invention. In FIG. 19, the Rx controller 315 successively sends Rx event elements of an Rx event to an Rx queue access management 3901 of the Rx queue management 390 and notices an Rx queue list management 3902 to queue the Rx event in the CIT seeker queue 3351 or the PPA queue 3352 based on a result of searching the CAM 325, i.e., a packet corresponding to the Rx event is of a priority connection or not. During the above processing, the Rx queue list management 3902 continuously informs the Rx queue access management 3901 of the base address of a next available memory block, thus the Rx queue access management 3901 can direct an Rx event element sent by the Rx controller 315 to an appropriate memory block.

Scorekeeper

When the Rx controller 315 finds a current packet having a priority connection matched to that of the CAM 325, it places a base address of the priority connection in the cache SRAM in an Rx event of the current packet and pushes the Rx event into the Rx queue 335. While the Rx event is processed sequentially by the five processing modules (i.e., devices 350, 355, 360, 370, 375) through the Rx queue 335, the PPA 355 and the MCU 360 require accessing the cache SRAM 310. At this point, the priority connection corresponding to the Rx event cannot be replaced; otherwise, the PPA 355 and/or the MCU 360 may access a wrong connection. Namely, priority connections corresponding to all Rx events in the Rx queue cannot be replaced, unless a priority connection is not required by any Rx event in the Rx queue 335.

To ensure that devices that use the cache SRAM can access accurate priority connection information, the scorekeeper 320 is provided, which is a controller with a function of scoring and positioned by the CAM 325 to thus record use status of the priority connections as well as search the CAM 325 for required CIDs. The use status recorded in the scorekeeper 320 has two types: first, recording total number of a priority connection locked, briefly referring to as "total locked number"; second, recording current number of the priority connection currently locked by the devices, briefly referring to as "current locked number". The "total locked number" information can provide the CIT updater 345 to find a priority connection with the least use as a replaced candidate. The "current locked number" information can be used to assure accurate accessing of the priority connection. As shown in FIG. 7 (or FIG. 9), the scorekeeper 320 is connected to the Rx controller 315, the DMA_Rx engine 370, a header generator 440 and the CIT updater 345.

When the Rx controller 315 receives a new coming packet, it searches the CAM 345 through the scorekeeper 320 for a priority connection matched. If the priority connection matched is found, the scorekeeper 320 sends an address of the priority connection in the cache SRAM 310 to the Rx controller 315 and adds two registers corresponding to the priority connection respectively by one. The two registers record the "total locked number" and the "current locked number" respectively.

When an Rx event corresponding to the packet is sent to the DMA_Rx engine 370, the Rx event does not require accessing the cache SRAM 310 and the DMA_Rx engine 370 signals the scorekeeper 320 to reduce the "current locked number" register by one.

In addition, the header generator 440 requires the connection information of the cache SRAM 310 so as to search the CAM 325 through the scorekeeper 320 for a CID matched. If the CID matched is found, "total locked number" and "current locked number" corresponding to a priority connection with the CID matched are added by one. When the header generator 440 need not the priority connection information used, it signals the scorekeeper 320 to reduce the "current locked number" by one as well.

The CIT updater 345 checks the cache SRAM to see if the connection information of "current locked number" equals to zero before performing a write-back operation on the cache SRAM 310. The CIT updater 345 performs the write-back operation when the "current locked number" equals to zero. Conversely, the CIT updater 345 sends a "the priority connection busy" message to the MCU 360 and give up the write-back operation. For a special situation such as a new priority connection to be established, the MCU 360 can force a write-back operation and thus establish the new priority connection in the cache SRAM 310. However, this may cause the Rx controller not to receiving a new coming packet until the connection information of "current locked number" in the cache SRAM 310 is decreased to zero and the new priority connection is established completely.

Memory Allocator

The memory allocator 340 manages memory space of the Rx buffer 330 and buffer space of the DRAM 500.

The memory space of the Rx buffer 330 is allocated in a unit block of 512 bytes. For a size of 64K bytes, the Rx buffer 330 can be divided into 128 unit blocks addressed by seven bits. When the Rx buffer 330 is managed by listing, it requires a 128*7 bit memory to store corresponding list, i.e., the system 10 will reserve 1K bytes to manage the Rx buffer 330.

The buffer space of the DRAM 500 is in a unit block of 2048 bytes. If a 64M bytes space of the DRAM 500 is used to temporarily store packet payloads, the space can be divided into 215 unit blocks addressed by 15 bits. When listing is applied for management, it requires 215*15 bytes (60K bytes), which cannot be placed in the system 10 in a form of SRAM but is placed in a list space of the DRAM 500.

The memory allocator 340 responds an assigned buffer based on a request sent by the Rx controller 315, except that one of the following conditions occurs. First, the buffer space of the DRAM 500 is arranged compulsorily as the assigned buffer when the Rx buffer 330 has no space. Second, the Rx buffer 330 is arranged compulsorily as the assigned buffer when its use rate is lower than P % ($100 \geq P \geq 0$).

As cited, a unit block in the Rx buffer 330 is not enough to contain a packet or its payload greater than 512 bytes and thus a segmentation operation is required for temporary storing. For example, a MTU-size packet in the Ethernet is distributed typically into three unit blocks to temporarily store. Further, Gigabit-level Ethernet supports a Jumbo Frame, which needs more unit blocks to temporarily store packet or its payload of the Jumbo Frame. The unit blocks for temporary storing are linked and managed by an expression of list in data structure.

Figure 20:
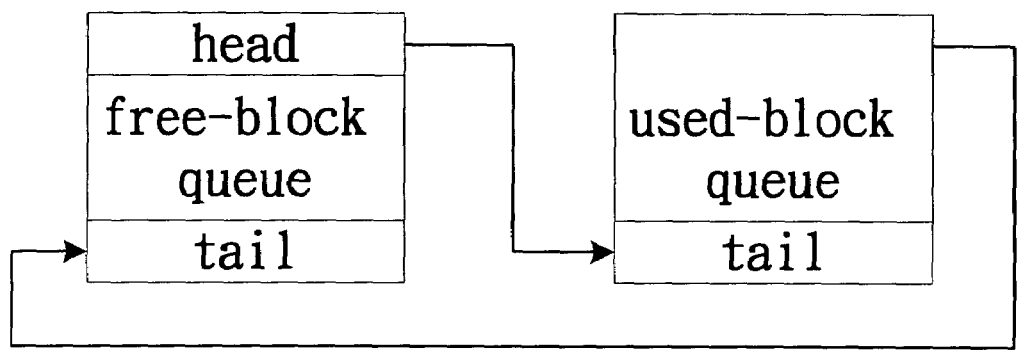
FIG. 20 is a schematic diagram of using a list to manage a receiving buffer or external memory according to the invention.

FIG. 20 is a schematic diagram of using a list to manage the Rx buffer 330 or the DRAM 500 according to the invention. As shown in FIG. 20, the Rx buffer 330 or the DRAM 500 are managed by the list to thus distinct a free-block queue from a used-block queue. The two queues share a same memory. The free-block queue can provide a next available unit block address while the used-block queue is used to link packets or their payloads. There is only an element in the queues of FIG. 20 that is the memory address of a next element. In addition, the memory address of each element can be mapped to a unit block of the Rx buffer 330 or DRAM 500.

When a content of the used-block is not referred and the used-block can be released into the free-block queue, the queue (or DRAM) management provides a first and a last block addresses storing a current packet or its payload. Accordingly, all blocks used can be released sequentially to the free-block queue through the first block address, the last block address and the used-block queue.

Figure 21:
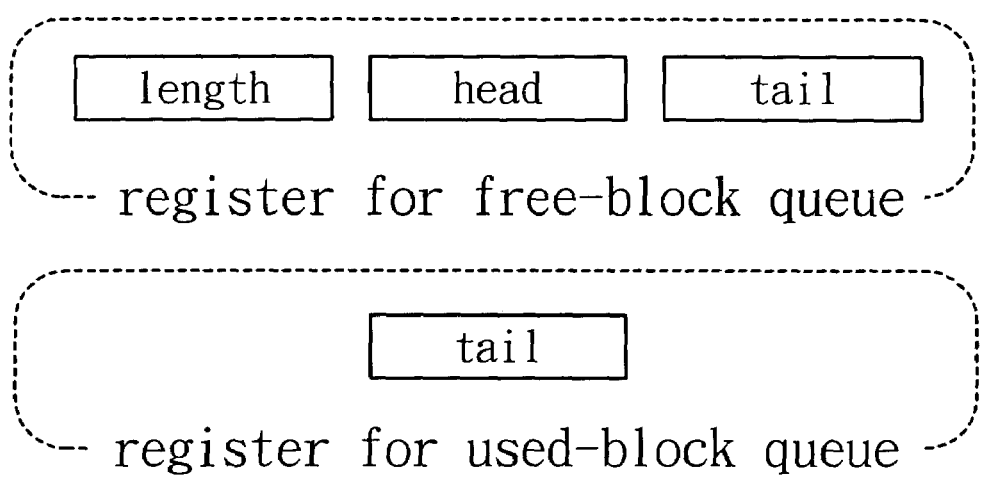
FIG. 21 is a schematic diagram of registers used by a free block queue and a used block queue according to the invention.

FIG. 21 shows registers used by the free block queue and the used block queue. The used-block queue has not the head and the length because a block to be released from the used-block queue is determined by the first and the last block addresses, not the head. In addition, the length of the used-block queue can be obtained through the length of the free-block queue because the two queues form the list shown in FIG. 20.

Transmitting Data Flow and Associated Configuration Design

When the host desires to send data, it places a transfer data or packet set to be a fast path connection in a host memory and informs the system 10 of a "Data (or Packet Ready)" message through a driver and the host interface 100. Next, after the MCU 360 receives the message through the driver, it asks the DMA_Tx engine 460 to read a transmitting (Tx) descriptor from the host memory to the descriptors and command buffer 410. Next, the MCU 360 processes the Tx descriptor and sends a result (such as each segment's base address, length . . . etc. after data segmentation) to the Tx queue 420.

Figure 22:
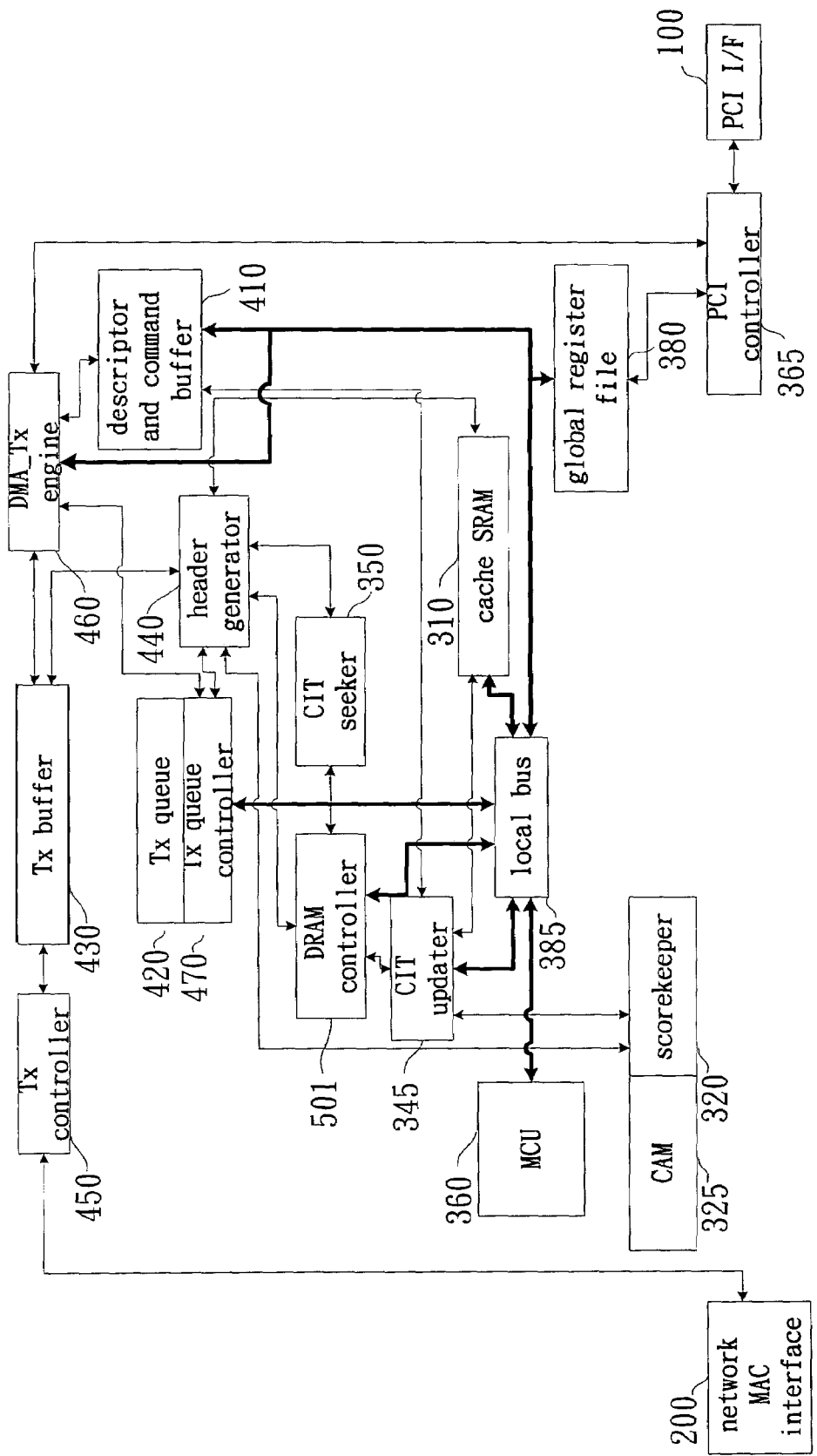
FIG. 22 is a schematic diagram of a transmitting configuration according to the invention.

On system initialization or connection establishment for a current transmission, the MCU 360 determines to support Jumbo Frame or not and sets corresponding flags. The MCU 360 first checks the flags in the protocol processing engine system 10 for finding 9K or 16K Jumbo Frame supported or not. If supported, the MCU 360 sets a field of the Tx descriptor to be a Jumbo Frame field. Next, the MCU 360 stores the Tx descriptor with the Jumbo Frame field in the Tx queue 420 and determines an appropriate transmitting frame size as 1.5K, 9K or 16K bytes. Next, the DMA_Tx 460 moves data from an address recorded in the transmitting frame to the Tx buffer 430. The header generator 440 generates a header to be transmitted. When the data is moved completely and the header is generated, a complete packet is generated for the Tx controller to send it out. FIG. 22 is a schematic diagram of a transmitting configuration according to the invention.

The CIT management mechanism performs comparison on the current transmission to determine if the current transmission is one of the fast paths set, while the MCU 360 determines the transmitting frame size. If the current transmission is a fast path transmission, the MCU 360 computes sizes and base addresses of fixed data block lengths and stores the base addresses in the Tx queue 420, which is referred to as segmentation. Transmitted data is segmented to obtain a transmitting frame size of packets. Next, segmented information is stored in the Tx queue. If the Tx queue is full, the information is stored in the DRAM until the Tx queue has free space. If the current transmission is a slow path transmission, the MCU 360 does not perform the segmentation and the transmitting frame size is determined as 1.5K bytes.

The Tx queue controller 470 manages the Tx queue 420. Because transmitted data flow can be easily predicted and managed, the Tx queue 420 can be a FIFO or ring buffer. For a 1 Gbps to 10 Gbps network bandwidth, the Tx queue 420 can be designed to have three to five queues with different frame sizes of 64K, 32K, 16K, 9K and 1.5K bytes. The Tx queue controller 470 manages R/W and status indication of the Tx queues 420.

The DMA_Tx engine 460 computes a checksum of packets or their payloads when moving them and sends a result to the header generator 440. The DMA_Tx engine 460 asks the memory allocator 340 for space and addresses of the Tx buffer 430 before reading transmitting description information of the Tx queue 420. The memory allocator 340 distributes the addresses to the DMA_Tx engine 460 and thus the DMA_Tx engine 460 reads transmitted payloads segmented (transmitted segments) and stored in the host memory through the DMA based on the information of the Tx queue 420. Next, the DMA_Tx engine 460 writes each transmitted segment to the Tx buffer 430 and reserves some space for writing a packet header into each transmitted segment by the header generator 440.

After the transmitted segments are written in the Tx buffer 430, the header generator 440 generates a TCP/IP header to add in front of each packet data. An information of the header is extracted from the transmitting description information and the CIT and accordingly performs the addition of the header. If the connection is a slow path, the header generator 440 does not add the header.

The Tx controller 450 sends the packet processed by the header generator 440 to the MAC. After the packet is sent, the Tx controller informs the memory allocator 340 of releasing the buffer occupied by the packet and placing a wait-for-acknowledge information corresponding to the packet in a wait-for-acknowledge queue.

The Tx buffer 430 can be a SRAM. The SRAM is divided into a transmitting (Tx) page size of blocks such that the Tx buffer 430 can be manageable by using a bitmap management to directly determine each page used or not. For example, if the Tx buffer 430 has 16K bytes and a page of 512 bytes, blocks can be managed directly by 32 bits (an internal microprocessor with a word of 32-bit) to fast allocate and release. When the capacity of each page is greater than 512 bytes, the link of multiple blocks uses several bits on the tail of a page as information of linking blocks.

A routine circuit for packet transfer as a data checksum generation is applied to each packet. The invention uses the DMA_Tx engine 460 to move transmitted (Tx) payloads from the host to the Tx buffer 430 and concurrently forward to the checksum generation for immediately computing a packet checksum without waiting all payloads stored, thereby speeding offloading. Thus, all payloads are stored and concurrently a corresponding checksum is obtained. Next, the checksum is sent to the header generator 440 to generate a corresponding checksum for all headers.

Memory Configuration and Access Mechanism of the Protocol Offload Engine System

Figure 23:
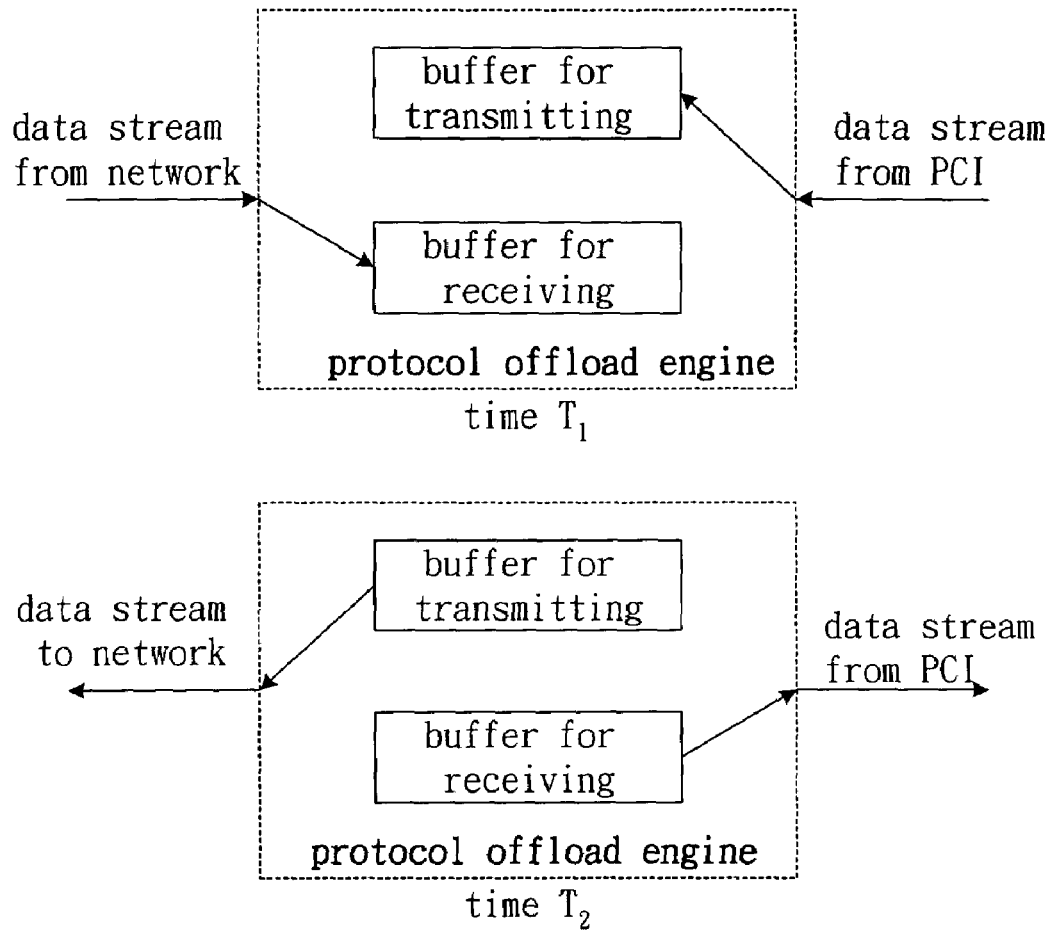
FIG. 23 is a schematic diagram of a full-duplex data flow switching according to the invention.

FIG. 23 is a schematic diagram of a full-duplex data flow switching according to the invention. As shown in FIG. 23, the switching uses separate receiving and transmitting buffer data paths to effective distribute data flow sent by the host and data flow sent by the network, thereby allowing the system 10 to have 1 Gbps full-duplex communication with the host and the network, i.e., the system 10 internally has a data processing rate of 2 Gbps. To achieve this, an interleaved memory is implemented in the system 10 to obtain the high bandwidth memory access speed.

The interleaved memory uses multiple SRAM modules to implement parallel access. If a port's SRAM module has a bandwidth of b MHz of, m SRAM modules have a total bandwidth of m*b MHz. In addition, data in successive addresses of the interleaved memory is distributed to the SRAM modules by interleaving. Interleaved distribution can avoid a single device occupying one SRAM module too long, which causes other devices to queue up for using it. In this embodiment, full-duplex bandwidth switching is obtained by space interleaving and time interleaving.

Figure 24:
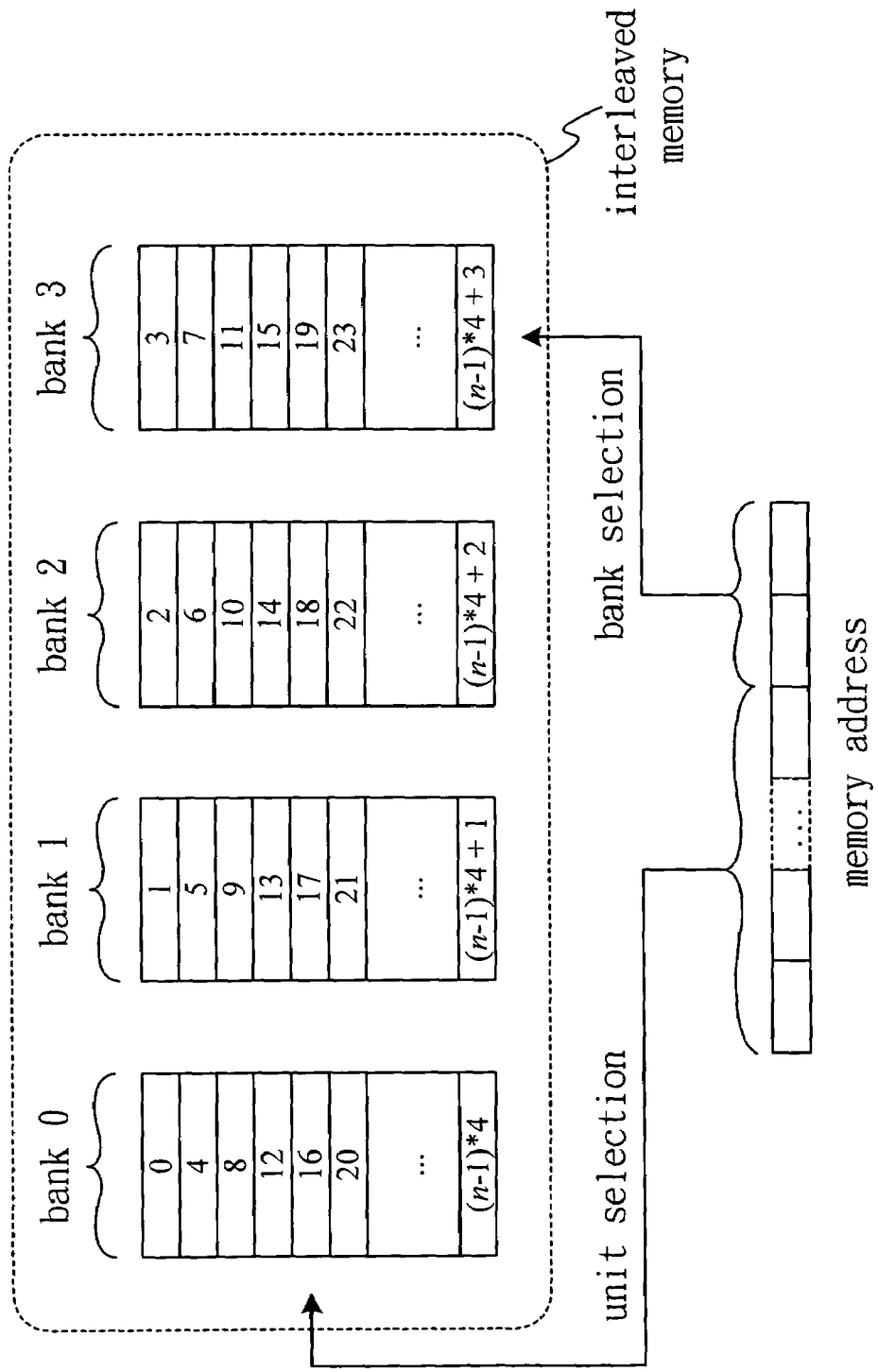
FIG. 24 is a relation of interleaved memory data distribution and memory addresses according to the invention.

FIG. 24 is a relation of interleaved memory data distribution and memory addresses according to the invention. In FIG. 24, an interleaved memory is 4-way interleaved, wherein four physical memory modules Bank0, Bank1, Bank2 and Bank3 are used. As shown in FIG. 24, each memory unit in each memory module has respective address, for example, the first memory unit of Bank0 is indicated by the address of zero, the second one indicated by four, the third one indicated by eight, and so on. Each memory unit can have a size changed with its practical application. In this embodiment, the Rx event buffer 3153, the Rx queue 335, the Rx buffer 330, the Tx buffer 430 and the Tx queue 420 have a size of 32 bits each. However, the 4-way interleaved is only an example for description, and alternately another form like 2-way interleaved, 8-way interleaved or the like can be applied.

The interleaved shown in FIG. 24 is referred to as low-order interleaved. This is because such an interleaved uses some least weight bits to determine a memory module to access, i.e., bank selection shown in FIG. 24. The remaining higher weight bits can determine a memory unit(s) to access, i.e., unit selection shown in FIG. 24.

Figure 25:
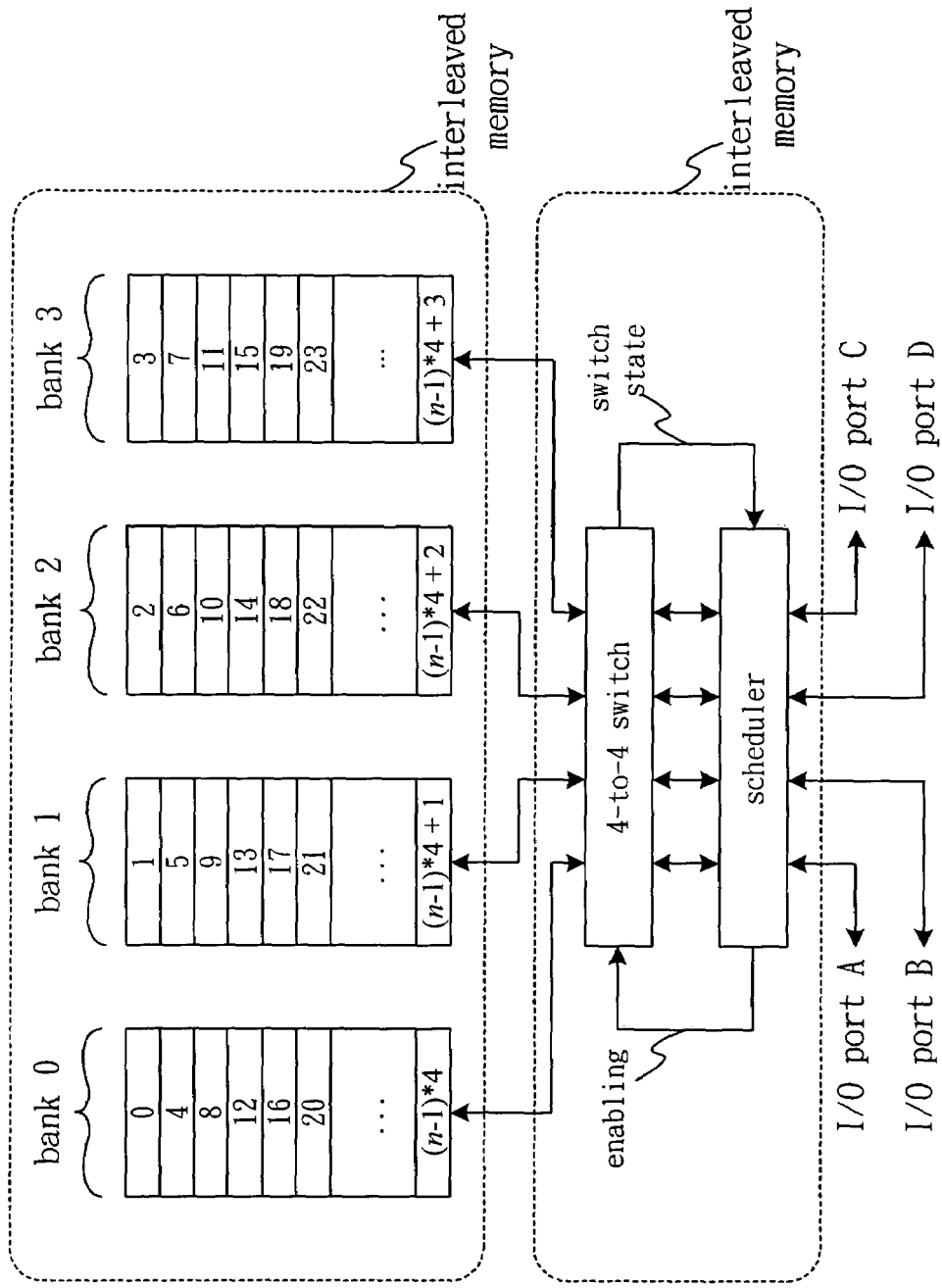
FIG. 25 is a schematic diagram of an interleaved memory controller controlling an interleaved memory according to the invention.
Figure 26:
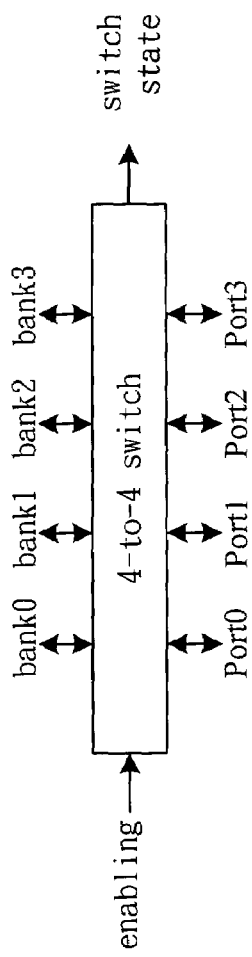
FIG. 26 is a schematic graph of switching operations of a 4-to-4 switch according to the invention.

FIG. 25 is a schematic diagram of an interleaved memory controller controlling the interleaved memory according to the invention. the controller has a 4-to-4 switch and a scheduler, wherein the first number 4 can be represented by a generic L to indicate input and output (I/O) port number at a side of the controller and the second number 4 can be represented by a generic M to indicate port number at a side of the physical SRAM modules. FIG. 26 is a schematic graph of switching operations of a 4-to-4 switch according to the invention.

As shown in FIG. 26, the 4-to-4 switch can switch different I/O ports to corresponding addresses of the physical SRAM modules for data access, thereby achieving space interleaving of the physical SRAM modules. The scheduler arranges use timing of the I/O ports for SRAM module access requests, thereby achieving time interleaving.

The interleaved memory is suitable for data access to successive addresses if the use number is smaller than or equal to the number of physical memory modules. As such, multiple devices can use different physical memory modules at a same time, thus a parallel effect is obtained. For data access to non-successive addresses, a higher memory use rate cannot be obtained but the time to wait for data access right is deterministic. Therefore, the system 10 accordingly applies the memory design way of timing and module interleaved in its memory modules.

In summary, the invention uses high-efficient content addressable memory (CAM) to manage connections that currently has the highest demand for speeding (i.e., priority connections) and are temporarily stored in a middle-speed SRAM. In addition, the remaining fast connections are temporarily stored in a low-cost DRAM. Such a graded access management can lower cost and also obtain preferred whole performance.

Although the present invention has been explained in relation to its preferred embodiment, it is to be understood that many other possible modifications and variations can be made without departing from the spirit and scope of the invention as hereinafter claimed.

What is claimed is:

1. A system for protocol processing engine, which is arranged between a host side and a media access control (MAC) layer to thus speed up data transmission, the system comprising:
   a host interface, which interfaces with the host side;
   a network media access control (MAC) interface, which interfaces with the MAC layer;
   a receiving subsystem, which is coupled between the host interface and the network MAC interface such that a network connection received by the network MAC interface is classified into a priority connection, fast connection or slow connection based on a pre-stored information and a hardware circuit corresponding to the connection classified is activated to speed up data transmission of the connection, and comprises:
      a DRAM, which stores packets to be processed and a connection information table (CIT);
      a cache SRAM, which stores an information of priority connections;
      a receiving controller, which is coupled to the network MAC interface in order to receive the network connection transmitted by the network MAC interface;
      a content addressable memory (CAM), which provides the information of the priority connections in the cache SRAM for fast searching; and
      a scorekeeper, which is coupled to the receiving controller and the CAM in order to handle accesses and associated use situations of the CAM;
      wherein the receiving controller defines destination and source's IP addresses and TCP ports, which is extracted from a header of a packet receiving the network connection, as a connection identification (CID) and accordingly searches the CAM through the scorekeeper, thereby determining if the network connection is a priority connection; and
   a transmitting subsystem, which is coupled between the host interface and the network MAC interface in order to transmit a host connection received by the host interface to the network MAC interface.

2. The system as claimed in claim 1, wherein the connections use a TCP, IP, UDP or iSCSI network protocol.

3. The system as claimed in claim 1, wherein the receiving subsystem further comprises:
   a receiving buffer, which is coupled to the receiving controller in order to store a received packet or its payload;
   a receiving queue, which is coupled to the receiving controller in order to store a receiving event corresponding to the received packet;
   a memory allocator, which is coupled to the receiving controller in order to allocate the receiving buffer for moving the payload by the receiving controller to the receiving buffer;
   wherein the receiving controller is based on a result of searching the CAM and a size of the received packet to request the memory allocator for temporarily storing the received packet or the payload in the receiving buffer.

4. The system as claimed in claim 3, wherein the receiving queue comprises a CIT seeker queue, a packet processing assistant (PPA) queue, a microprocessor (MCU) queue, a direct memory access receiving (DMA_Rx) queue and a descriptor maker queue.

5. The system as claimed in claim 4, wherein the receiving controller re-arranges the header of the received packet into a data structure of the receiving event and sends the data structure of the receiving event to the receiving queue for store.

6. The system as claimed in claim 5, wherein the receiving subsystem further comprises:
- a CIT updater, which establishes an information of a new connection in the DRAM;
- a CIT seeker, which is coupled to the receiving queue in order to search the DRAM for a matched information of fast connection in accordance with a receiving event in the CIT seeker queue and next write a base memory address, which starts to store the matched information of fast connection, back to the receiving event;
- a packet processing assistant (PPA), which is coupled to the receiving queue in order to obtain an information of destination for the received packet according to a content of the PPA queue; and
- a microprocessor (MCU), which is coupled to the receiving queue in order to handle supported communication protocols.

7. The system as claimed in claim 6, wherein the receiving subsystem further comprises:
- a PCI controller, which is coupled to an PCI interface in order to transmit and receive data of the host side;
- a DMA_Rx engine, which arranges an address of a host destination in the PPA or the MCU, places the address of the host destination in a respective packet header information stored in the receiving queue, and sends a packet or its payload corresponding to the respective packet header information to the host side through the PCI controller;
- a descriptor maker, which produces a receiving descriptor corresponding to the packet or its payload sent by the DMA_Rx engine and uses the PCI controller to send the receiving descriptor produced to the host side.

8. The system as claimed in claim 7, wherein the transmitting subsystem comprises:
- a descriptors and command buffer, which stores transmitting descriptors of host transmitting connections for further processing by the MCU;
- a transmitting queue, which stores processed transmitting descriptors that are processed by the MCU;
- a transmitting buffer, which stores payload data of the host transmitting connections;
- a header generator, which produces a header of a packet of the host connection that is one of the host transmitting connections; and
- a transmitting controller, which sends the packet of the host connection to the MAC layer.

9. A system for protocol processing engine, which is arranged between a host side and a media access control (MAC) layer to speed up data transmission, the system comprising:
- a host interface, which interfaces with the host side;
- a network media access control (MAC) interface, which interfaces with the MAC layer;
- a DRAM, which stores packets to be processed and a connection information table (CIT);
- a DRAM interface, which accesses the DRAM;
- a cache SRAM, which stores an information of priority connections;
- a content addressable memory (CAM), which has a copy of the priority connections in the cache SRAM for fast searching;
- a receiving controller, which is coupled to the network MAC interface in order to receive a network connection transmitted by the network MAC interface;
- a scorekeeper, which is coupled to the receiving controller and the CAM in order to handle accesses and associated use situations of the CAM;
- a receiving buffer, which is coupled to the receiving controller in order to store a received packet or its payload;
- a receiving queue, which is coupled to the receiving controller in order to store a receiving event corresponding to the received packet;
- a memory allocator, which is coupled to the receiving controller in order to allocate the receiving buffer for moving the payload by the receiving controller to the receiving buffer;
- a CIT updater, which establishes an information of a new connection in the DRAM;
- a CIT seeker, which is coupled to the receiving queue in order to search the DRAM for a matched information of fast connection in accordance with a receiving event in the CIT seeker queue and next write a base memory address, which starts to store the matched information of fast connection, back to the receiving event;
- a packet processing assistant (PPA), which is coupled to the receiving queue in order to obtain an information of destination for the received packet according to a content of the PPA queue; and
- a microprocessor (MCU), which is coupled to the receiving queue in order to handle supported communication protocols;
- a PCI controller, which is coupled to an PCI interface in order to transmit and receive data of the host side;
- a DMA_Rx engine, which arranges an address of a host destination in the PPA or the MCU, places the address of the host destination in a respective packet header information stored in the receiving queue, and sends a packet or its payload corresponding to the respective packet header information to the host side through the PCI controller;
- a descriptor maker, which produces a receiving descriptor corresponding to the packet or its payload sent by the DMA_Rx engine and uses the PCI controller to send the receiving descriptor produced to the host side;
- a descriptors and command buffer, which stores transmitting descriptors of host transmitting connections for further processing by the MCU;
- a transmitting queue, which stores processed transmitting descriptors that are processed by the MCU;
- a transmitting buffer, which stores payload data of the host transmitting connections;
- a header generator, which produces a packet header for one of the host transmitting connections;
- a global register file, which stores control information, connection information, payloads, packets of slow path connections, and processed status;
- a DMA transmitting engine, which moves the CIT descriptors to the descriptors and command buffer;
- a receiving queue management, which manages the receiving queue; and
- a transmitting controller, which sends the packet header to the MAC layer.

10. The system as claimed in claim 9, wherein the connections use a network protocol that is a TCP, IP, UDP or iSCSI, the host interface is connected to a server, a computer or a game host, and the MAC interface is connected to a MAC chip or a MAC IP.

11. The system as claimed in claim 9, wherein the transmitting buffer, the receiving buffer, the cache SRAM and the receiving queue are implemented by an interleaved memory.

12. The system as claimed in claim 11, wherein the interleaved memory consists of M one-port physical SRAM modules, for $M \geq 2$.

13. The system as claimed in claim 9, wherein the CIT records an information of a pre-defined number of fast path connections all stored in the DRAM, and K of which are copied in the cache SRAM as priority connections, where K is a pre-defined number.

14. The system as claimed in claim 9, wherein connection information stored in the CIT is provided by a host at the host side.

15. The system as claimed in claim 9, wherein when a host at the host side establishes a new fast connection, a conventional protocol stack on the host is used to establish corresponding connection information for the new fast connection in a memory of the host.

16. The system as claimed in claim 14, wherein the cache SRAM and the CAM store a first layer of CIT while the DRAM stores a second layer of CIT.

17. The system as claimed in claim 16, wherein the cache SRAM stores connection information of K priority connections for corresponding processing modules to access, the CAM stores respective CIDs of the K priority connections, and addresses of the CIDs stored in the CAM corresponds to respective block addresses storing the priority connections in the cache SRAM.

18. The system as claimed in claim 17, wherein each CID comprises or computes from fields of a packet header, such as a source IP address, a destination IP address, a source TCP port and a destination TCP port.

19. The system as claimed in claim 17, wherein the scorekeeper controls the CAM, provides the receiving controller and the header generator with required CID searching service, provides the CIT updater with required CID updating service, receives a Connection-End message from the header generator and the DMA_Rx, and scores practical use of the CIDs of the CAM as a record.

20. The system as claimed in claim 9, wherein the transmitting queue, the header generator, the DMA_Tx engine, a checksum generation and a transmitting (Tx) queue controller have T frames respectively, $5 \geq T \geq 3$.

21. The system as claimed in claim 20, wherein the transmitting queue us an FIFO or ring buffer.

22. The system as claimed in claim 9, wherein the receiving controller comprises a header validation and extraction unit, a receiving event buffer, an event buffer controller and an in-stream distributor.

23. The system as claimed in claim 22, wherein the header validation and extraction unit performs error detection on header and payload of a packet, extracts a CID from the header to accordingly search the CAM through the scorekeeper for determining if the packet is of a priority connection currently established, asks the memory allocator through the in-stream distributor to assign a buffer area for temporarily storing the payload, arranges an information of the header into a receiving event to thus temporarily store in the receiving event buffer, and sends the packet or the payload to the in-stream distributor to further deliver it to the buffer area assigned by the memory allocator.

24. The system as claimed in claim 23, wherein the header validation and extraction unit asks the memory allocator through the in-stream distributor for the buffer area.

25. The system as claimed in claim 23, wherein the memory allocator assigns the buffer area in response to a request asked by the receiving controller, and the memory allocator compulsorily arranges the buffer space of the DRAM as a buffer area when the receiving buffer has no space or the receiving buffer as a buffer area when the receiving buffer has a use rate lower than P %, for $100 \geq P \geq 0$.

26. The system as claimed in claim 25, wherein P is adjusted dynamically.

27. The system as claimed in claim 23, wherein the memory allocator uses a unit block of assigned buffer area as a unit to accordingly allocate temporary memory addresses to the receiving controller, and the receiving controller at a temporary store operation records a first and a last block addresses in a receiving event.

28. The system as claimed in claim 23, wherein the receiving event consisting of a plurality of event elements is a pre-defined data structure containing information of a header and an information required when relaying in the receiving queue.

29. The system as claimed in claim 9, wherein the receiving queue comprises a CIT seeker queue, a PPA queue, an MCU queue, a DMA_Rx queue and a descriptor maker queue.

30. The system as claimed in claim 29, wherein the receiving controller sends a receiving event produced to the CIT seeker queue or the PPA queue for store, next when the receiving event in the CIT seeker queue or the PPA queue is no more used, the receiving event is moved to the MCU queue, but if the receiving event is in the PPA queue, an event element of the receiving event that has a host destination information skips the MCU queue and is sent directly to the DMA_Rx queue, next when the receiving event in the MCU queue is no more used, the receiving event is moved to the DMA_Rx queue, next when the receiving event in the DMA_Rx queue is no more used, the receiving event is moved to the descriptor maker queue, and when the receiving event in the descriptor maker queue is no more used, memory space used by all event elements of the receiving event are released.

31. The system as claimed in claim 29, wherein the receiving event is processed by the CIT seeker, the PPA, the MCU, the DMA_Rx and the descriptor maker respectively.

32. The system as claimed in claim 30, wherein the receiving controller produces the receiving event based on an attribution of a packet corresponding to the receiving event, and the receiving event is moved to the PPA queue when the attribution indicates that the packet is of a priority connection and conversely, to the CIT seeker queue.

33. The system as claimed in claim 32, wherein when the receiving event is of a priority connection, a memory address obtained from the CAM by receiving controller is recorded in the receiving event and indicates a block of the cache SRAM that stores connection information of the priority connection corresponding to the receiving event.

34. The system as claimed in claim 31, wherein the CIT seeker searches for memory addresses of the CIT space in the DRAM corresponding to connection data with respect to the receiving event and writes the memory addresses searched back to corresponding fields of the receiving event, and if the connection information is not found in the CIT space, the CIT seeker set a flag of the receiving event.

35. The system as claimed in claim 31, wherein the PPA processes high regularity and repeat protocol processing events of a priority-connection packet, and when a packet is unable to be processed by the PPA, the PPA finds a destination information of the packet and writes the destination information back to corresponding event element such that the MCU queue is skipped and the event element is sent directly to the DMA_Rx queue to move a payload of the packet forward to a host memory.

36. The system as claimed in claim 31, wherein when a host destination address is ready and placed in a packet header information in the receiving queue by the PPA or the MCU, the in-stream distributor reads a packet or its payload corresponding to the packet header information from the receiving buffer or the buffer space of the DRAM and sends the packet or its payload read to a host memory through the host interface.

37. The system as claimed in claim 31, wherein the descriptor maker produces a receiving descriptor based on the receiving event and sends the receiving descriptor produced to a host receiving queue of a host memory through the host interface.

38. The system as claimed in claim 36, wherein the in-stream distributor is based on a first block address and a last block address to request the memory allocator for all block addresses linked between the first block address and the last block address and next applies the block addresses linked to read packets or their payloads out of the receiving buffer or the buffer space of the DRAM.

39. The system as claimed in claim 37, wherein the host receiving queue accumulates receiving descriptors sent by the protocol offload engine and the receiving descriptors are processed by a CPU of the host in batch after an interrupt coalescing event at the host side occurs.

* * * * *